(12) United States Patent
Ohtsuki et al.

(10) Patent No.: US 9,797,520 B2
(45) Date of Patent: Oct. 24, 2017

(54) FLOW CONTROL APPARATUS AND PROGRAM

(71) Applicant: Hitachi Metals, Ltd., Minato-Ku, Tokyo (JP)

(72) Inventors: Haruaki Ohtsuki, Mie (JP); Masashi Sonoda, Kumagaya (JP)

(73) Assignee: Hitachi Metals, Ltd., Tokyo (JP)

( * ) Notice: Subject to any disclaimer, the term of this patent is extended or adjusted under 35 U.S.C. 154(b) by 474 days.

(21) Appl. No.: 14/376,065

(22) PCT Filed: Jan. 31, 2013

(86) PCT No.: PCT/JP2013/052146
§ 371 (c)(1),
(2) Date: Jul. 31, 2014

(87) PCT Pub. No.: WO2013/115298
PCT Pub. Date: Aug. 8, 2013

(65) Prior Publication Data
US 2014/0374634 A1    Dec. 25, 2014

(30) Foreign Application Priority Data

Feb. 3, 2012  (JP) ................................. 2012-022318

(51) Int. Cl.
| F16K 31/00 | (2006.01) |
| G05D 7/06 | (2006.01) |
| F16K 7/12 | (2006.01) |

(52) U.S. Cl.
CPC ............ *F16K 31/007* (2013.01); *F16K 7/123* (2013.01); *G05D 7/0617* (2013.01); *G05D 7/0635* (2013.01)

(58) Field of Classification Search
CPC ..... F16K 31/007; F16K 7/123; G05D 7/0617; G05D 7/0635
See application file for complete search history.

(56) References Cited

U.S. PATENT DOCUMENTS

| 6,445,980 B1 | 9/2002 | Vyers |
| 7,004,150 B2 * | 2/2006 | Augustin ............ F02D 41/2096 123/494 |

(Continued)

FOREIGN PATENT DOCUMENTS

| JP | 09171411 A | 6/1997 |
| JP | 11353033 A | 12/1999 |

(Continued)

OTHER PUBLICATIONS

Japanese Patent Office, "Internaitonal Search Report re Application No. PCT/JP2013/052146", Apr. 9, 2013, p. 3 Published in: JP.

*Primary Examiner* — Charles Kasenge
(74) *Attorney, Agent, or Firm* — Neugeboren O'Dowd PC

(57) ABSTRACT

A flow control apparatus and a program are disclosed herein. A flow control apparatus includes a piezoelectric element coupled to a valve element configuring a flow regulating valve and that works the valve element to regulate a flow, a driving circuit that applies a voltage to the piezoelectric element to drive the piezoelectric element, an accepting means for accepting a target flow, and an output means for outputting a signal corresponding to the voltage applied to the piezoelectric element to the driving circuit, to change the flow so as to coincide with the target flow. When the target flow is changed, the output means transiently outputs a signal corresponding to a voltage value different from a target voltage value corresponding to the target flow after the change, and then the output means outputs a signal corresponding to a voltage change converging at the target voltage value.

17 Claims, 15 Drawing Sheets

(56) References Cited

U.S. PATENT DOCUMENTS

| | | | |
|---|---|---|---|
| 7,603,186 B2 | 10/2009 | Smirnov | |
| 7,934,665 B2* | 5/2011 | Erickson | B05B 7/02 118/313 |
| 7,944,673 B2* | 5/2011 | Kamata | F16K 31/0651 123/490 |
| 7,975,938 B2* | 7/2011 | Erickson | B05B 7/02 118/313 |
| 8,112,182 B2* | 2/2012 | Tokuhisa | G01F 1/6842 700/121 |
| 8,240,635 B2* | 8/2012 | Crivelli | A61M 5/16881 251/129.04 |
| 8,587,180 B2* | 11/2013 | Sugita | G05D 7/0635 310/316.01 |
| 8,740,182 B2* | 6/2014 | Crivelli | A61M 5/16881 251/11 |
| 8,827,175 B2* | 9/2014 | Fritsch | F02D 41/2096 123/478 |
| 2002/0198668 A1 | 12/2002 | Lull et al. | |
| 2003/0106533 A1* | 6/2003 | Crofts | F02M 47/027 123/446 |
| 2005/0035213 A1* | 2/2005 | Erickson | B05B 7/02 239/102.1 |
| 2006/0118169 A1 | 6/2006 | Junk et al. | |
| 2006/0169202 A1* | 8/2006 | Erickson | B05B 7/02 118/323 |
| 2007/0198131 A1* | 8/2007 | Tokuhisa | G01F 1/6842 137/12 |
| 2008/0134968 A1* | 6/2008 | Kamata | F16K 31/0651 118/314 |
| 2008/0212252 A1* | 9/2008 | Kamata | F16K 31/0651 361/154 |
| 2008/0314314 A1* | 12/2008 | Erickson | B05B 7/02 118/302 |
| 2009/0140184 A1* | 6/2009 | Crivelli | A61M 5/16881 251/129.01 |
| 2009/0140185 A1* | 6/2009 | Crivelli | A61M 5/16881 251/129.01 |
| 2010/0107972 A1* | 5/2010 | Erickson | B05B 7/02 118/313 |
| 2010/0116911 A1* | 5/2010 | Fritsch | F02D 41/2096 239/580 |
| 2011/0108138 A1* | 5/2011 | Sugita | G05D 7/0635 137/488 |
| 2012/0150356 A1* | 6/2012 | Crivelli | A61M 5/16881 700/282 |
| 2012/0209436 A1 | 8/2012 | Takijiri et al. | |
| 2012/0283703 A1* | 11/2012 | Crivelli | A61M 5/16881 604/891.1 |
| 2013/0053446 A1* | 2/2013 | Muzzio | A61K 9/0019 514/570 |

FOREIGN PATENT DOCUMENTS

| | | |
|---|---|---|
| JP | 2000250633 A | 9/2000 |
| JP | 2001142541 A | 5/2001 |
| JP | 2001147723 | 5/2001 |
| JP | 2003504750 | 2/2003 |
| JP | 2007200318 | 8/2007 |
| JP | 2010015580 | 1/2010 |
| JP | 2011090405 | 5/2011 |
| JP | 2012168822 | 9/2012 |

* cited by examiner

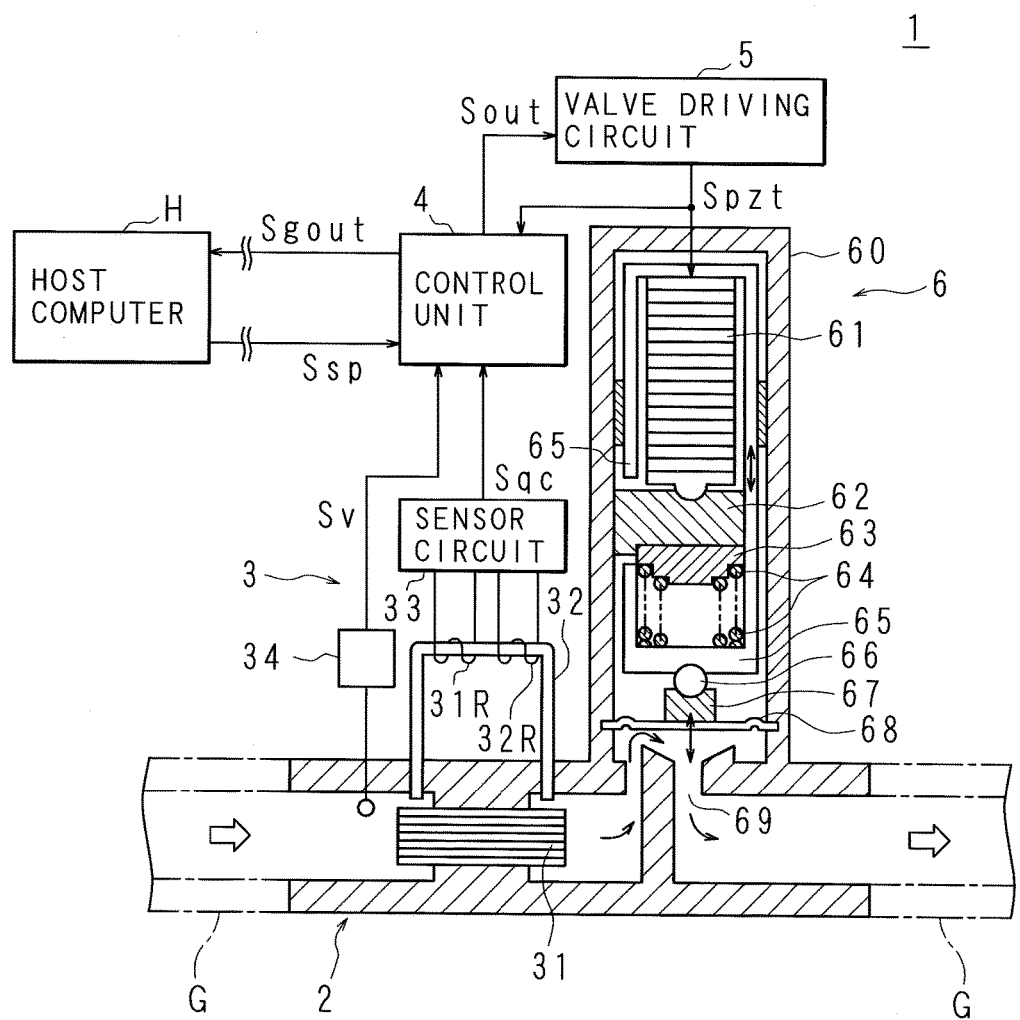
F I G. 1

FLOW CONTROL APPARATUS AND PROGRAM

CLAIM OF PRIORITY

This application is the national phase under 35 U.S.C. §371 of PCT International Application No. PCT/JP2013/052146 which has an International filing date of Jan. 31, 2013 and designated the United States of America.

FIELD

The present invention relates to a flow control apparatus and a program configured to control a flow of a fluid.

BACKGROUND

As for a flow control apparatus utilized for a manufacture processing of a semiconductor, a liquid crystal panel or the like, a quick flow response corresponding to a change of a flow set value is required. Thus, there is a technique for promptly changing the flow in response to the change of the flow set value (for example, see U.S. Pat. No. 7,603,186, Japanese Patent Application Laid-Open No. 2001-147723 and Japanese Patent Application Laid-Open No. 2012-168822).

SUMMARY

Anyway, when an actuator configured to open and close a valve in a flow channel is a piezo actuator, the piezoelectric element has a great capacitance. Thus, a displacement response of the piezo actuator in response to the change of the flow set value is slow. Therefore, the response of the flow change is also delayed.

The technique disclosed by U.S. Pat. No. 7,603,186 is a technique of regulating a parameter that is utilized for performing the PI control of a flow, and thus cannot shorten the flow response caused by the delay of the displacement response of the piezo actuator. A flow control method disclosed by Japanese Patent Application Laid-Open No. 2001-147723 applies an initial voltage to a piezoelectric element, the initial voltage being slightly lower than a voltage at the time when a fluid begins to flow, and then the method transitions to a velocity type PID control.

Thus, in order to quicken the response, it is considered to increase the initial voltage disclosed by Japanese Patent Application Laid-Open No. 2001-147723. However, if the initial voltage is increased, it causes the overshoot and deteriorates the quality of the product. A flow control apparatus disclosed by Japanese Patent Application Laid-Open No. 2012-168822 compensates a phase shift of an opening degree of a valve based on an operation quantity, by a digital arithmetic. However, the responsiveness is not different from a responsiveness of a conventional flow control apparatus.

The present application has been made in view of such circumstances, and has an object to provide a flow control apparatus and a program that can implement a quick response control without the overshoot.

A flow control apparatus according to the present application comprises a piezoelectric element that is coupled to a valve element configuring a flow regulating valve and that works the valve element to regulate a flow, a driving circuit that applies a voltage to the piezoelectric element to drive the piezoelectric element, an accepting means for accepting a target flow, and an output means for outputting a signal, corresponding to the voltage applied to the piezoelectric element, to the driving circuit to change the flow so as to coincide the flow with the target flow accepted by the accepting means, and when the target flow accepted by the accepting means is changed, the output means transiently outputs a signal corresponding to a voltage value different from a target voltage value corresponding to the target flow after the change, and then outputs a signal corresponding to a voltage change converging at the target voltage value.

In the flow control apparatus according to the present application, the output means is provided which outputs a signal, corresponding to the voltage applied to the piezoelectric element by the driving circuit, to the driving circuit. When the accepted target flow is changed, the output means transiently outputs a signal corresponding to a voltage value different from the target voltage value that corresponds to the target flow after the change. The output means then outputs a signal corresponding to a voltage change converging at the target voltage value after the change.

As to the flow control apparatus according to the present application, when the target flow accepted by the accepting means in a case that the flow regulating valve is in a closed condition is changed, the output means outputs a signal, corresponding to a voltage change indicating a greater amplitude with respect to a target voltage value corresponding to the target flow after the change than a time when the target flow in a case that the flow regulating valve is not in the closed condition is changed, to the driving circuit.

In the flow control apparatus according to the present application, when the target flow accepted in a closed condition of the flow regulating valve is changed, the output means outputs a signal, corresponding to a voltage change indicating a greater amplitude with respect to the target voltage value corresponding to the target flow after the change than a time when the target flow accepted in not the closed condition of the flow regulating valve is changed.

As to the flow control apparatus according to the present application, when the target flow accepted by the accepting means in a case that the flow regulating valve is in a closed condition is changed, the output means outputs a signal corresponding to a spike-like voltage change to the driving circuit.

In the flow control apparatus according to the present application, the output means outputs a signal corresponding to the spike-like voltage change to the driving circuit, when the target flow accepted by the accepting means in a case that the flow regulating valve is in a closed condition is changed.

As to the flow control apparatus according to the present application, when the target flow accepted by the accepting means in a case that the flow regulating valve is in a closed condition is changed, the output means outputs a signal corresponding to a voltage change rising in a step-like manner up to a voltage value higher than a target voltage value corresponding to the target flow after the change, and then outputs a signal, corresponding to a voltage change converging at the target voltage value, to the driving circuit.

In the flow control apparatus according to the present application, when the target flow accepted in a case that the flow regulating valve is in a closed condition is changed, the output means outputs a signal, corresponding to a voltage change that rises quickly in a step-like manner toward a voltage higher than the voltage corresponding to the target flow.

A flow control apparatus according to the present application comprises a detecting means for detecting a flow of a fluid flowing in a flow channel, a piezoelectric element that is coupled to a valve element configuring a flow regulating valve which opens and closes the flow channel, and that works the valve element to regulate the flow, a driving circuit that applies a voltage to the piezoelectric element to drive the piezoelectric element, an accepting means for accepting a target flow of the fluid, and a control means for outputting a signal, corresponding to the voltage applied to the piezoelectric element, to the driving circuit based on a deviation of the target flow accepted by the accepting means and of the flow detected by the detecting means, so as to control the flow through the driving circuit and the piezoelectric element, the control means comprises a generating means for generating a signal corresponding to the deviation, and a compensating means for compensating the signal generated by the generating means by a control element that contains a numerical value relating to an electrical characteristic of the piezoelectric element and a constant in accordance with a response characteristic of the piezoelectric element, and the signal compensated by the compensating means is outputted to the driving circuit.

In the flow control apparatus according to the present application, the control means generates a signal corresponding to the deviation of the accepted target flow and of the detected flow. The compensating means of the control means compensates the generated signal, with the control element containing a numeral value relating to the electrical characteristic of the piezoelectric element and a constant in accordance with the response characteristic of the piezoelectric element.

As to the flow control apparatus according to the present application, the control element comprises a first transfer function that contains a gain relating to the electrical characteristic of the piezoelectric element, and a second transfer function that contains a constant in accordance with the response characteristic of the piezoelectric element and contains the gain.

In the flow control apparatus according to the present application, the control element relating to the compensating means includes the first transfer function and the second transfer function. The first transfer function contains the gain relating to the electrical characteristic of the piezoelectric element. The second transfer function contains the gain relating to the electrical characteristic of the piezoelectric element and the constant in accordance with the response characteristic of the piezoelectric element.

As to the flow control apparatus according to the present application, the first and second transfer functions contain a gain relating to the electrical characteristic of the driving circuit.

In the flow control apparatus according to the present application, the first transfer function and the second transfer function contain a gain relating to the electrical characteristic of the driving circuit.

As to the flow control apparatus according to the present application, the control element relates to a response from a time when a signal is inputted from the control means to the driving circuit to a time when the piezoelectric element works the valve element.

In the flow control apparatus according to the present application, the control element relating to the compensating means relates to the response from a time when the control means inputs a signal to the driving circuit to a time when piezoelectric element works the valve element.

As to the flow control apparatus according to the present application, when the flow regulating valve is closed, the control means makes a voltage applied by the driving circuit to the piezoelectric element become different from a voltage, at which the valve opening degree of the flow regulating valve becomes zero, by a predetermined voltage Vc in a direction where the flow regulating valve is further closed, and when the target flow accepted by the accepting means in a case that the flow regulating valve is in a closed condition is changed, the compensating means compensates a signal in which the Vc is superimposed on the signal generated by the generating means.

In the flow control apparatus according to the present application, when the flow regulating valve is closed, the control means is configured with respect to the driving circuit to make the voltage applied to the piezoelectric element become different from the voltage, at which the valve opening degree of the flow regulating valve becomes zero, only by the predetermined voltage Vc in a direction where the flow regulating valve is further closed. When the target flow accepted in a case that the flow regulating valve is in a closed condition is changed, the compensating means superimposes the predetermined voltage Vc on the generated signal.

As to the flow control apparatus according to the present application, the driving circuit comprises an output means for outputting a signal, corresponding to the voltage applied to the piezoelectric element, to the control means, the control means comprises a signal generating means for generating a feedback signal in order to regulate the response characteristic of the piezoelectric element based on the signal outputted by the output means, and the compensating means compensates the signal in which the Vc is superimposed on the signal generated by the generating means and compensates the feedback signal generated by the signal generating means.

In the flow control apparatus according to the present application, the driving circuit outputs a signal, corresponding to the voltage applied to the piezoelectric element, to the control means. The control means generates the feedback signal for regulating the response characteristic of the piezoelectric element, based on the signal outputted by the driving circuit. The compensating means compensates the signal in which the predetermined voltage Vc is superimposed on the generated signal and compensates the generated feedback signal.

The flow control apparatus according to the present application comprises a converting means for converting a signal corresponding to the Vc, based on the second transfer function, and the signal generating means generates the feedback signal by the compensation of the signal outputted by the output means and the signal converted by the converting means.

In the flow control apparatus according to the present application, the converting means converts the signal corresponding to the predetermined voltage Vc, based on the second transfer function. The flow control apparatus compensates the signal outputted by the driving circuit and the signal converted by the converting means, so as to generate the feedback signal for regulating the response characteristic of the piezoelectric element.

The flow control apparatus according to the present application comprises a reducing means for reducing a change of the Vc, and when the target flow accepted by the accepting means in a case that the flow regulating valve is in a closed condition is changed, the compensating means compensates a signal in which the Vc reduced by the reducing means is superimposed on the signal generated by the generating means.

In the flow control apparatus according to the present application, when the flow regulating valve is closed, the voltage applied to the piezoelectric element with respect to the driving circuit becomes different from the voltage, at which the valve opening degree of the flow regulating valve becomes zero, only by the predetermined voltage Vc in a direction where the flow regulating valve is further closed. The flow control apparatus reduces this Vc. When the target flow accepted in a case that the flow regulating valve is in a closed condition is changed, the compensating means superimposes the reduced Vc on the generated signal.

The flow control apparatus according to the present application comprises a reducing means for reducing a change of the Vc, the converting means converts a signal corresponding to the Vc reduced by the reducing means, and when the target flow accepted by the accepting means in a case that the flow regulating valve is in a closed condition is changed, the compensating means compensates a signal in which the Vc reduced by the reducing means is superimposed on the signal generated by the generating means and compensates the feedback signal generated by the signal generating means.

In the flow control apparatus according to the present application, when the flow regulating valve is closed, the voltage applied to the piezoelectric element with respect to the driving circuit becomes different from the voltage, at which the valve opening degree of the flow regulating valve becomes zero, only by the predetermined voltage Vc in a direction where the flow regulating valve is further closed. The flow control apparatus reduces this Vc. The converting means converts the signal corresponding to the reduced Vc, based on the second transfer function. The flow control apparatus compensates the signal outputted by the driving circuit and the signal converted by the converting means from the signal corresponding to the reduced Vc, so as to generate the feedback signal for regulating the response characteristic of the piezoelectric element. The compensating means compensates the signal in which the reduced Vc is superimposed on the generated signal, and compensates the generated feedback signal.

As to the flow control apparatus according to the present application, the piezoelectric element is a laminated piezoelectric element.

In the flow control apparatus according to the present application, the piezoelectric element is a laminated piezoelectric element.

As to the flow control apparatus according to the present application, the flow regulating valve comprises a valve port arranged in the flow channel, and the valve element is a plate-like diaphragm that is capable of being elastically deformed by a pressing force from the piezoelectric element to seat around the valve port.

In the flow control apparatus according to the present application, the valve element is a plate-like diaphragm. The diaphragm is elastically deformed by the pressing force from the piezoelectric element, so as to seat around the valve port arranged in the flow channel in which the fluid flows.

A program according to the present application is for making a computer of a flow control apparatus execute processes, the flow control apparatus comprises a detecting means for detecting a flow, a piezoelectric element that is coupled to a valve element configuring a flow regulating valve and that works the valve element to regulate a flow, a driving circuit that applies a voltage to the piezoelectric element to drive the piezoelectric element, and an accepting means for accepting a target flow, the program is configured to make the computer output a signal, corresponding to a voltage applied to the piezoelectric element based on a deviation of the target flow accepted by the accepting means and of the flow detected by the detecting means, to the driving circuit so as to make the computer execute processes for controlling a flow through the driving circuit and the piezoelectric element, the program is configured to make the computer generate the signal outputted to the driving circuit based on the deviation, and the program is configured to make the computer execute a compensating computation relating to the generated signal, based on a numerical value relating to an electrical characteristic of the piezoelectric element and on a constant in accordance with a response characteristic of the piezoelectric element.

In the program according to the present application, a computer of the flow control apparatus is made to execute the following processes. The computer generates a signal outputted to the driving circuit based on the deviation of the target flow accepted by the flow control apparatus and of the detected flow. The computer executes the compensating computation relating to the generated signal based on the numerical value relating to the electrical characteristic of the piezoelectric element and based on the constant in accordance with the response characteristic of the piezoelectric element.

As to the program according to the present application, a process executing the compensating computation executes the compensating computation relating to the generated signal, with a transfer function consisting of a ratio of a first transfer function that contains a gain relating to the electrical characteristic of the piezoelectric element and a second transfer function that contains a constant in accordance with the response characteristic of the piezoelectric element and the gain.

In the program according to the present application, the first transfer function contains the gain relating to the electrical characteristic of the piezoelectric element. The second transfer function contains the gain relating to the electrical characteristic of the piezoelectric element and the constant in accordance with the response characteristic of the piezoelectric element. The program makes the computer execute the compensating computation relating to the generated signal, with the transfer function that consists of the ratio of the first transfer function and the second transfer function.

As to the program according to the present application, when the target flow accepted by the accepting means is changed from a value less than a predetermined value to a value equal to or more than the predetermined value, a signal corresponding to a predetermined voltage is added to the signal generated by the process that generates the signal.

In the program according to the present application, when the target flow accepted by the flow control apparatus is changed from a value less than the predetermined value to a value equal to or more than the predetermined value, the signal corresponding to the predetermined voltage is added to the signal outputted to the driving circuit.

According to an aspect disclosed by the present application, it is possible to implement a quick response control without the overshoot.

The above and further objects and features will more fully be apparent from the following detailed description with accompanying drawings.

BRIEF DESCRIPTION OF THE DRAWINGS

FIG. 1 is a block diagram illustrating a configuration example of hardware of a flow control apparatus.

DETAILED DESCRIPTION

Figure 2:
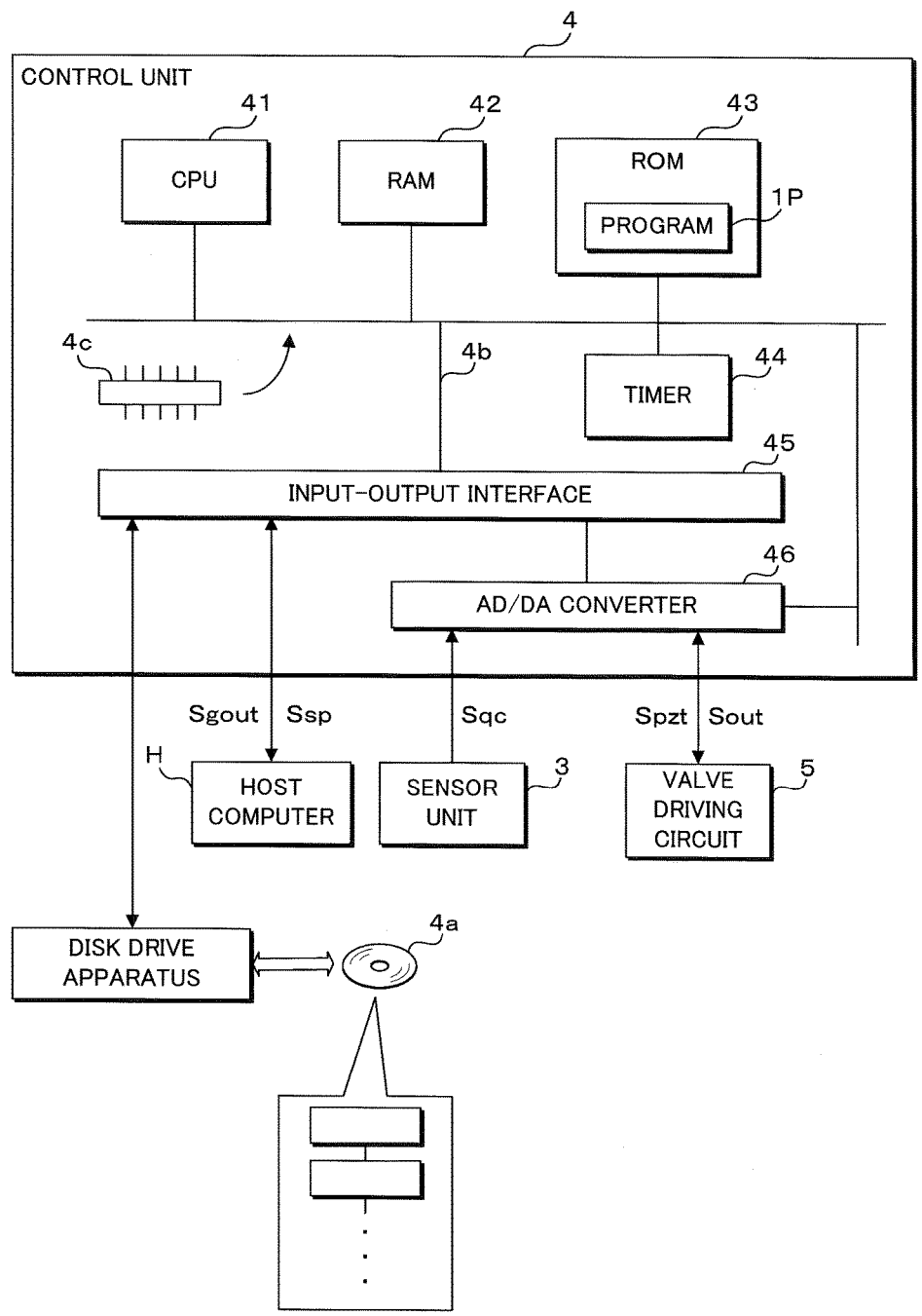
FIG. 2 is a block diagram illustrating a configuration example of hardware of a control unit.

Hereinafter, embodiments are explained in reference to the drawings. A flow control apparatus relating to the present embodiment is a flow control apparatus utilized for manufacturing a semiconductor, an optical fiber, a solar battery, a liquid crystal panel, an organic EL (Electro Luminescence), a display, a LED (Light Emitting Diode), a food, cosmetics, a medicine, or the like. In addition, the flow control apparatus according to the present embodiment may be an apparatus controlling a mass flow of a fluid, or an apparatus controlling a volume flow of a fluid. Hereinafter, the embodiments are explained with an example of a flow control apparatus (mass flow controller) controlling a mass flow of a gas fluid.

It should be noted that the present invention is not limited to the embodiments described below.

Embodiment 1

FIG. 1 is a block diagram illustrating a configuration example of hardware of a flow control apparatus 1. The flow control apparatus 1 is connected to an external host computer H that controls a whole of the manufacture processing of a product. The flow control apparatus 1 accepts a flow set signal Ssp from the host computer H, the flow set signal Ssp indicating a flow of gas to be supplied by the flow control apparatus 1 to a product manufacturing apparatus. On the other hand, the flow control apparatus 1 outputs a flow output signal Sgout to the host computer H, the flow output signal Sgout indicating a flow of gas currently flowing.

The flow control apparatus 1 includes a flow channel portion (flow channel) 2, a sensor unit (detecting means) 3, a control unit (control means, computer) 4, a valve driving circuit (driving circuit, output means) 5, and a valve unit (flow regulating valve) 6.

The sensor unit 3 detects a flow of gas taken in by the flow channel portion 2. The control unit 4 compares a flow value of gas detected by the sensor unit 3 with a flow set value indicated by the flow set signal Ssp, and outputs an output signal Sout to the valve driving circuit 5 to make the actual flow value become the flow set value (target flow value). The valve driving circuit 5 inputs the output signal Sout, and outputs a valve driving signal Spzt for driving the valve unit 6 to the valve unit 6, based on the output signal Sout that has been inputted. The valve unit 6 inputs the valve driving signal Spzt, and regulates the flow of gas flowing in the flow channel portion 2 based on the valve driving signal Spzt that has been inputted.

In the flow control apparatus 1, the control unit 4 performs a feedback control on the valve unit 6 based on the flow set value and the flow detected by the sensor unit 3, so as to control the flow of gas flowing in the flow channel portion 2.

For example, the flow channel portion 2 is a tubular gas passage made of stainless steel. The upstream of the flow channel portion 2 is connected to a gas pipe G that supplies gas to the flow channel portion 2. The downstream of the flow channel portion 2 is connected to a gas pipe G that supplies gas to the product manufacturing apparatus.

The sensor unit 3 includes a bypass group 31, a sensor tube 32, coils 31R, 32R, a sensor circuit 33 and a pressure detecting unit 34.

The bypass group 31 consists of a plurality of bundled bypass tubes, and is arranged at the upstream side of the flow channel portion 2. The sensor tube 32 is a capillary tube made of stainless steel, and is arranged at the both ends of the bypass group 31 so as to bypass the bypass group 31. The sensor tube 32 is configured to flow a small amount of gas with a constant ratio with respect to the gas flowing in the bypass group 31. Thus, gas having the constant ratio with respect to all of the gas flow flowing in the flow channel portion 2 is supplied to the sensor tube 32.

The coil 31R and the coil 32R are a pair of heating resistance wires respectively wound around the upstream portion and the downstream portion of the sensor tube 32, and are connected in series. When an electrical current is flowed to the coil 31R and the coil 32R, the coil 31R and the coil 32R generate heat. When no gas is flowed in the sensor tube 32, the temperatures of the coil 31R and the coil 32R are balanced to be the same temperature. On the other hand, when gas is flowed in the sensor tube 32, the heat of the coil 31R is transferred to the gas and thus the gas is heated by the coil 31R. To the coil 32R, the heat is supplied from the gas heated at the upstream side. Thus, the temperature change or the temperature difference in proportion to the gas flow is generated on the coil 31R and the coil 32R.

The sensor circuit 33 includes a bridge circuit that converts the temperature change or the temperature difference of the coil 31R and the coil 32R into an electrical signal, an amplifying circuit that amplifies the electrical signal converted by the bridge circuit, and the like. The sensor circuit 33 outputs an analog flow signal Sqc to the control unit 4, the analog flow signal Sqc indicating a flow after the amplification.

For example, the pressure detecting unit 34 is a pressure transducer. The pressure detecting unit 34 samples a pressure value of the gas flowing in the flow channel portion 2 at predetermined time intervals, and converts the sampled pressure value of the gas into a pressure detection signal Sv. The pressure detecting unit 34 outputs the converted pressure detection signal Sv to the control unit 4. The pressure detection signal Sv outputted by the pressure detecting unit 34 is utilized at the time when the control unit 4 decides a control constant or the like.

It should be noted that the pressure detecting unit 34 may not be provided when the control unit 4 does not utilize the pressure detection signal Sv for the flow control.

The control unit 4 includes a computer, and accepts the analog flow signal Sqc and the pressure detection signal Sv from the sensor unit 3. In addition, the control unit 4 accepts the flow set signal Ssp from the host computer H. The control unit 4 outputs the analog flow signal Sqc, as the flow output signal Sgout indicating a flow of gas currently flowing, to the host computer H. In addition, the control unit 4 outputs the output signal Sout to the valve driving circuit 5, for operating the valve unit 6 to coincide the flow indicated by the analog flow signal Sqc and the flow indicated by the flow set signal Ssp.

The valve driving circuit 5 is a circuit that drives a valve of the valve unit 6. The valve driving circuit 5 inputs the output signal Sout from the control unit 4 and amplifies the output signal Sout having been inputted, to generate a valve driving voltage. The valve driving circuit 5 applies the generated valve driving voltage to the valve unit 6. The valve opening degree of the valve unit 6 is regulated by the high and low level of the valve driving voltage.

It should be noted that the valve driving signal Spzt is a signal in accordance with the valve driving voltage.

The valve driving circuit 5 may or may not output the valve driving signal Spzt to the control unit 4.

When the valve driving circuit 5 outputs the valve driving signal Spzt to the control unit 4, the control unit 4 accepts the valve driving signal Spzt from the valve driving circuit 5. The control unit 4 utilizes the accepted valve driving signal Spzt for the feedback control of the flow.

The valve unit 6 includes a case 60, an actuator (piezoelectric element) 61, a restricting member 62, a spring seat 63, a coil spring 64, a valve rod 65, a spherical body 66, a thrust button 67, a diaphragm (valve element) 68 and a valve port 69. It should be noted that a drawing of a block construction for assembling the valve unit 6 is omitted.

The case 60 is a box that encloses each component of the valve unit 6. The case 60 is arranged on an upper surface of the flow channel portion 2 at the downstream of the sensor unit 3, and the bottom portion of the case 60 is joined to the flow channel portion 2. At the bottom portion of the case 60, a space is arranged in which a fluid can flow. On the bottom surface of the case 60, two openings are formed. One of them is an opening for inflowing the gas passed through the bypass group 31 into the space at the bottom portion of the case 60. The other one of them is an opening for outflowing the gas from the space at the bottom portion of the case 60 into the flow channel portion 2. The latter opening configures the valve port 69 of the valve unit 6.

At the inside of the case 60 opposite to the valve port 69, there are the actuator 61, the restricting member 62, the spring seat 63, the coil spring 64, the valve rod 65, the spherical body 66, the thrust button 67, and the diaphragm 68 which are sequentially arranged from the top to the bottom.

For example, the actuator 61 is a laminated piezoelectric element (piezo element). The laminated piezoelectric element has a configuration in which a number of PZT ceramic disks are laminated. When a high valve driving voltage is applied, the laminated piezoelectric element extends in the laminated direction. When a low valve driving voltage is applied, the laminated piezoelectric element is contracted in the laminated direction. In short, the actuator 61 is mechanically extended or contracted in a top and bottom direction by the applied valve driving voltage.

The restricting member 62 is a member that inhibits a downward displacement of the actuator 61. The spring seat 63 is attached to the restricting member 62, and holds the coil spring 64. The valve rod 65 is a cylindrical member formed between the case 60 and the actuator 61. The valve rod 65 is configured to move up and down along a guide arranged on an inner surface of the case 60 due to the extension and contraction of the acturator 6. The coil spring 64 is accommodated in a space between the restricting member 62 at the upper side and the bottom surface of the valve rod 65 at the lower side. The coil spring 64 is a spiral spring that urges the valve rod 65 downward.

On the outer surface of the bottom surface of the valve rod 65, a shallow concave portion facing downward is formed. The thrust button 67 is a metal base, and a shallow concave portion facing upward is formed on the upper surface of the thrust button 67. The spherical body 66 is a ball enclosed between the concave portion of the valve rod 65 and the concave portion of the thrust button 67. The valve rod 65, the spherical body 66, and the thrust button 67 are rigidly sequenced, to transfer the force generated by the mechanical extension and contraction of the actuator 61 at the upper side to the diaphragm 68 at the lower side. The spherical body 66 has a function to prevent the force in the top and bottom direction transferred to the diaphragm 68 from being unevenly distributed at one position.

The diaphragm 68 is a flat metal plate that can be elastically deformed. A peripheral edge portion of the diaphragm 68 is loosely fitted to an inner wall of the case 60, and the diaphragm 68 is configured to be able to move flexibly. Underneath the diaphragm 68, the valve port 69 is arranged in which the gas can flow. A portion around the valve port 69 is served as a valve seat of the valve unit 6.

When a voltage is not applied to the laminated piezoelectric element of the actuator 61, the valve rod 65 is pushed down by a push pressure from the coil spring 64 and the diaphragm 68 is elastically deformed to deflect downward. The elastically deformed diaphragm 68 seats on the valve seat, and closes the valve port 69. For keeping the closed condition of the valve unit 6 at that time, the spring load of the coil spring 64 is selected. On the other hand, when a voltage is applied to the laminated piezoelectric element of the actuator 61, the laminated piezoelectric element extends in the laminated direction. Since the downward displacement of the extending laminated piezoelectric element is inhibited by the restricting member 62, the laminated piezoelectric element extends upward. Thus, an upper end portion of the valve rod 65 is pushed in an upward direction by the laminated piezoelectric element, the valve rod 65 moves upward, and the diaphragm 68 is released from the compressive force of the coil spring 64 through the spherical body 66 and the thrust button 67. The diaphragm 68 released from the compressive force of the coil spring 64 attempts to restore to the original shape by the restoring force of the diaphragm 68, so as to form a gap between the diaphragm 68 and the valve seat and to release the valve port 69.

In short, the distance between the diaphragm 68 and the valve port 69 is changed in response to the extension and contraction of the actuator 61 and the up and down movement of the valve rod 65. When a valve driving voltage applied to the actuator 61 is lowered, the actuator 61 contracts and the valve rod 65 moves downward. Then, the distance between the diaphragm 68 and the valve port 69 becomes smaller, and the flow of gas flowing in the flow channel portion 2 is decreased. On the other hand, when the valve driving voltage applied to the actuator 61 is heightened, the actuator 61 extends and the valve rod 65 moves upward. Then, the distance between the diaphragm 68 and the valve port 69 becomes greater, and the flow of gas flowing in the flow channel portion 2 is increased.

The valve unit 6 explained above is a normally closed valve that is closed when a voltage is not applied to the laminated piezoelectric element. However, the valve unit 6 may be a normally opened valve that is opened when a voltage is not applied to the laminated piezoelectric element. Hereinafter, the valve unit 6 is treated as the normally closed valve.

FIG. 2 is a block diagram illustrating a configuration example of hardware of the control unit 4. The control unit 4 includes a CPU (Central Processing Unit) (output means, compensating means, generating means, converting means) 41, a RAM (Random Access Memory) 42 and a ROM (Read Only Memory) 43. In addition, the control unit 4 includes a timer 44, an input-output interface (accepting means) 45, and an AD/DA converter 46. The CPU 41, the RAM 42, the ROM 43, the timer 44, the input-output interface 45, and the AD/DA converter 46 are connected to each other by a bus 4b.

The CPU 41 controls each component of the flow control apparatus 1. The CPU 41 loads a program 1P recorded in the ROM 43, and executes the program 1P. It should be noted that the CPU 41 is an example of a processor included by the control unit 4. A MPU (Micro Processor Unit) may be utilized instead of the CPU 41.

For example, the RAM 42 is a SRAM (Static RAM), a DRAM (Dynamic RAM) or the like, and temporarily records a task variable, data, and the like required during processes executed by the CPU 41. It should be noted that the RAM 42 is an example of a main storing device. A flash memory, a memory card or the like may be utilized instead of the RAM 42.

For example, the ROM 43 is a non-volatile semiconductor memory, or a read-only storing medium other than the semiconductor memory. The ROM 43 records the program 1P to be executed by the CPU 41. As for the ROM 43, a ROM disposed inside the flow control apparatus 1 may be utilized or a ROM disposed outside the flow control apparatus 1 may be utilized.

The timer 44 counts the date and time, and outputs the counted results to the CPU 41. Based on the date and time accepted from the timer 44, the CPU 41 executes a process, for example, an interrupt process in accordance with the program 1P.

The input-output interface 45 is an interface including a digital input-output port for sending and receiving signals or information with the host computer H, the sensor unit 3, and the valve driving circuit 5. It should be noted that the input-output interface 45 can be connected to an external disk drive apparatus. In addition, the input-output interface 45 has a function of connecting to a network, such as a LAN (Local Area Network), a WAN (Wide Area Network), and Internet.

The AD/DA converter 46 converts the analog signal accepted from the sensor unit 3 and the valve driving circuit 5 into the digital signal, and outputs the converted digital signal to the input-output interface 45. In addition, the AD/DA converter 46 converts the digital signal accepted from the input-output interface 45 into the analog signal, and outputs the converted analog signal (for example, output signal Sout) to the valve driving circuit 5.

As illustrated in FIG. 2, the program 1P for making the flow control apparatus 1 actuate may be loaded from an optical disk 4a through a disk drive apparatus. Alternatively, as illustrated in FIG. 2, the program 1P may be loaded from an external information processing apparatus or an external recording apparatus through the input-output interface 45 and the network. Furthermore, as illustrated in FIG. 2, a semiconductor memory 4c such as a flash memory recording the program 1P may be mounted inside the control unit 4.

Figure 3:
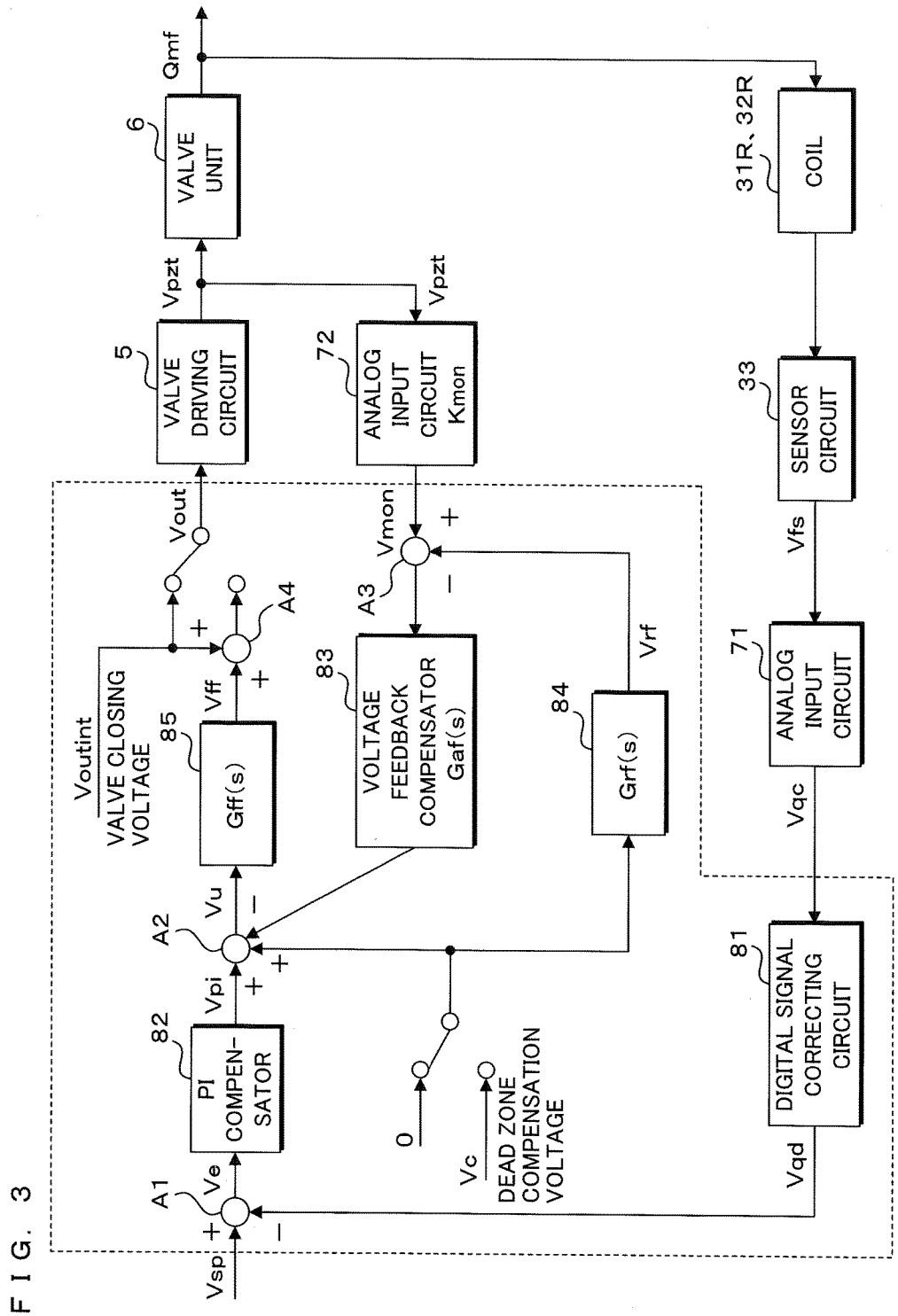
FIG. 3 is a block line chart illustrating an example of a flow control system.

FIG. 3 is a block line chart illustrating an example of a flow control system. This flow control system utilizes the control unit 4 as the center, and includes configuration elements or control elements of the sensor unit 3, the valve driving circuit 5, and the valve unit 6. It should be noted in FIG. 3 that the control unit 4 corresponds to an element group at a region surrounded by broken lines. Although the control unit 4 of the flow control apparatus 1 is a computer illustrated in FIG. 2, FIG. 3 illustrates a case that a circuit takes over the function of the computer.

A flow Qmf depicted at an upper-right portion in FIG. 3 is detected as the temperature change amount or the temperature difference by the coils 31R, 32R. The temperature change amount or the temperature difference detected by the coils 31R, 32R is converted into the electrical signal by the bridge circuit included in the sensor circuit 33, and amplified by the amplifying circuit, so as to become a flow sensor signal Vfs. Since the signal has a relationship corresponding to the voltage, the signal is hereinafter represented by V.

The flow sensor signal Vfs is subjected to a predetermined analog process at an analog input circuit 71, to be an analog flow signal Vqc. The analog flow signal Vqc is a signal whose high frequency component is greatly attenuated by the frequency characteristic of the flow sensor signal Vfs. This attenuated amount is compensated by a digital signal correcting circuit 81, so as to generate a digital flow signal Vqd.

It should be noted that the detection characteristic of the coils 31R, 32R has a great time constant in seconds, and thus the frequency characteristic of the flow sensor signal Vfs is corrected by the analog input circuit 71 and the digital signal correcting circuit 81. Therefore, an effect of quickening the responsiveness of the flow control is induced.

The analog input circuit 71 may be included by the sensor unit 3 or by the control unit 4.

The digital flow signal Vqd is compared with the flow set signal Vsp at a summing point (generating means) A1 at an upper-left portion in FIG. 3, to generate a flow deviation signal Ve. The flow deviation signal Ve is subjected to a proportional integral compensation by a PI compensator 82, to be an input signal Vpi for a summing point A2.

Anyway, in the flow control system of FIG. 3, the valve driving voltage applied to the actuator 61 of the valve unit 6 is utilized for the feedback control. The summing point A2 is served as a comparing unit positioned at an input side of the feedback control system relating to the valve driving voltage. The valve driving voltage is a voltage applied to a terminal of the laminated piezoelectric element that configures the actuator 61. Thus, the valve driving voltage is hereinafter referred to as a terminal voltage Vpzt, too.

The terminal voltage Vpzt is detected and declined by an analog input circuit 72 having a gain Kmon, and is converted into a terminal voltage signal Vmon. The terminal voltage signal Vmon corresponds to a response of the laminated piezoelectric element relating to the actuator 61.

It should be noted that the analog input circuit 72 may be included by the valve driving circuit 5 or by the control unit 4. In addition, the analog input circuit 72 may include a filter that executes several analog processes.

The terminal voltage signal Vmon becomes a voltage feedback signal through a summing point A3 and a voltage feedback compensator 83 that has a transfer function Gaf(s) (signal generating means). Then, the voltage feedback signal is inputted into the summing point A2.

When a flow set value indicated by the flow set signal Vsp is 0, the flow control system treats a signal, in which the voltage feedback signal is subtracted from the input signal Vpi, as an operation quantity signal Vu.

On the other hand, when the flow set value indicated by the flow set signal Vsp is not 0, the flow control system treats a signal, in which the voltage feedback signal is subtracted from a sum of a dead zone compensation signal Vc and the input signal Vpi, as the operation quantity signal Vu. As for the terminal voltage Vpzt, there are a voltage corresponding to a condition in which the valve of the valve unit 6 is completely closed, and a voltage corresponding to an open/close boundary condition of the valve of the valve unit 6. A voltage corresponding to a difference of these voltages is referred to as a dead zone compensation voltage. The dead zone compensation signal Vc is a signal corresponding to the dead zone compensation voltage.

When the flow set value is 0, the flow control apparatus 1 closes the valve of the valve unit 6. At that time, the flow control apparatus 1 adds pressure to the valve in a close direction, in order to ensure the condition in which the valve of the valve unit 6 is closed. Thus, when the flow set value is 0, the flow control apparatus 1 offsets the terminal voltage Vpzt in a direction of closing the valve greater than the terminal voltage Vpzt at which the valve becomes in the open/close boundary condition. However, when the flow set value is not 0, the flow control apparatus 1 needs to open the valve of the valve unit 6 up to a valve opening degree corresponding to the flow set value over the open/close boundary condition. Thus, a signal in which the dead zone compensation signal Vc is added to the difference between the input signal Vpi and the voltage feedback signal is treated as the operation quantity signal Vu.

The flow control system inputs a correction signal Vrf, in which the dead zone compensation signal Vc is processed by a transfer function Grf(s) (converting means) 84, into the summing point A3. Then, the flow control system inputs a signal, in which the correction signal Vrf is subtracted from the terminal voltage signal Vmon, into the voltage feedback compensator 83.

The flow control system modifies the operation quantity signal Vu, which is obtained from the process described above, by a transfer function Gff(s) (compensating means) 85 so as to generate a modified operation quantity signal Vff.

When the flow set value is 0, the flow control system sets a voltage signal Voutint to be an output signal Vout that is inputted into the valve driving circuit 5, the voltage signal Voutint corresponding to a voltage value inputted into the valve driving circuit 5 so as to make a voltage applied to the valve unit 6 by the valve driving circuit 5 become 0 V. On the other hand, when the flow set value is not 0, the flow control system adds the Voutint with the modified operation quantity signal Vff at a summing point A4, and sets the added signal as the output signal Vout that is inputted into the valve driving circuit 5.

It should be noted that, when the control unit 4 is configured to include a computer, the AD/DA converter 46 not illustrated in FIG. 3 positions at the input side of the valve driving circuit 5, and the output signal Vout corresponds to the signal that is outputted to the valve driving circuit 5 by the AD/DA converter 46.

Figure 4:
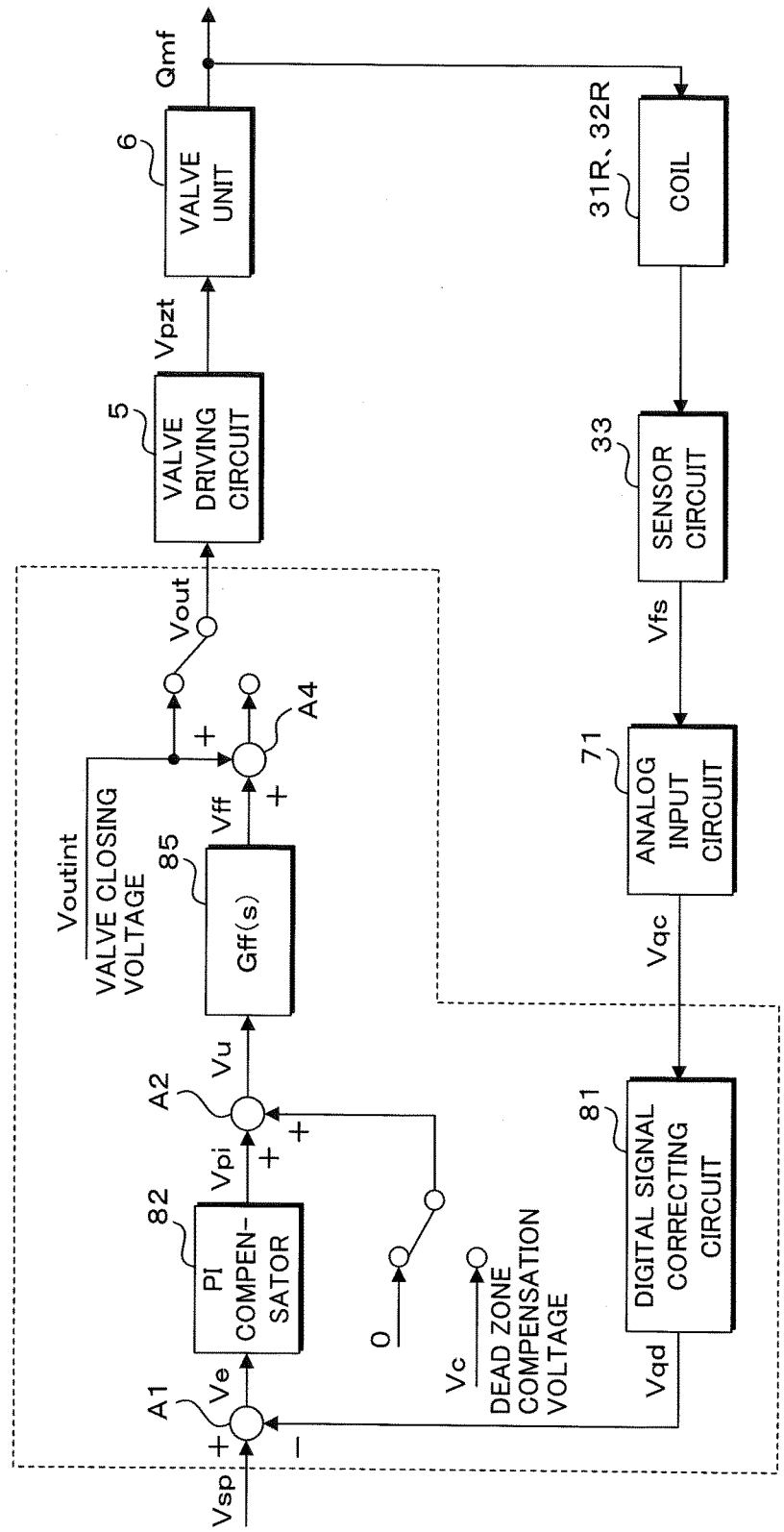
FIG. 4 is a block line chart illustrating another example of the flow control system.

FIG. 4 is a block line chart illustrating another example of the flow control system. A difference of FIG. 4 from FIG. 3 is the absence of the signal loop relating to the voltage feedback from the terminal voltage Vpzt applied to the valve unit 6. The flow control system of FIG. 4 corresponds to the flow control system of FIG. 3 in which the transfer function Gaf(s) of the voltage feedback compensator 83 is 0. The flow control system of the flow control apparatus 1 may be the flow control system of FIG. 3 or the flow control system of FIG. 4.

Next, a transfer function model of the control unit 4 is explained.

In the valve driving circuit 5 driving the actuator 61, the response from the output signal Vout to the terminal voltage Vpzt is similar to a response of the primary delay system. However, the response of the valve driving circuit 5 is different from a mere response of the primary delay system, and can be approximated by a model in which responses of two primary delay systems are superimposed. Hereinafter, a transfer characteristic from the output signal Vout to the terminal voltage Vpzt is represented by the model in which two primary delay systems are superimposed, and the model is referred to as an actual situation model. The transfer characteristic of the actual situation model is represented by a following formula (1).

$$V_{pzt}(s) = K_{pzt}\left(\frac{K_{1\_pzt}}{T_{1\_pzt}s+1} + \frac{K_{2\_pzt}}{T_{2\_pzt}s+1}\right)V_{out}(s) \qquad (1)$$

A $V_{pzt}(s)$ is a terminal voltage. A $V_{out}(s)$ is an output voltage corresponding to the output signal Vout. A Kpzt is a voltage gain of the valve driving circuit 5 and of the laminated piezoelectric element relating to the actuator 61. A K1_pzt and a K2_pzt are respectively gains of two primary delay transfer functions. A T1_pzt and a T2_pzt are respectively time constants of two primary delay transfer functions. Between the K1_pzt and the K2_pzt, there is a relationship of a following formula (2).

$$K_{1\_pzt} + K_{2\_pzt} = 1 \qquad (2)$$

The actual situation model has a higher model accuracy due to two primary delay expressions in the parentheses at the right side of the formula (1), than a conventional single primary delay expression.

A transfer function (first transfer function) relating to the response characteristic in the actual situation model of the formula (1) is represented by a following formula (3).

$$G_{pztz}(s) = \frac{V_{pzt}(s)}{V_{out}(s)}$$
$$= K_{pzt} \cdot \frac{(K_{1\_pzt}T_{2\_pzt} + K_{2\_pzt}T_{1\_pzt})s + (K_{1\_pzt} + K_{2\_pzt})}{(T_{1\_pzt}s+1)(T_{2\_pzt}s+1)} \qquad (3)$$

A response characteristic of the formula (3) affects the response characteristic of the entire flow control system. When the response characteristic of the formula (3) is slow, it becomes a factor restricting the response of the flow control system.

On the other hand, a model is provided and the model expresses a transfer function, in which the laminated piezoelectric element relating to the actuator 61 shows a preferable quick responsiveness, as a primary delay element. Hereinafter, this model is referred to as a normative situation model. The transfer function (second transfer function) of the normative situation model is represented by a following formula (4).

$$G_{pzts}(s) = \frac{V_{pzt}(s)}{V_{out}(s)} = \frac{K_{pzt}}{T_{pzt}s+1} \qquad (4)$$

A gain Kpzt is the same as a gain Kpzt of the actual situation model, and is a constant in accordance with the voltage gain of the valve driving circuit 5 and of the laminated piezoelectric element relating to the actuator 61. A time constant Tpzt is a variable that is specified in accordance with the preferable responsiveness of the valve driving circuit 5 and of laminated piezoelectric element relating to the actuator 61. For example, a response characteristic of a Gpzts(s) quickens by setting a less value to the time constant Tpzt.

It should be noted that the gain Kpzt may be a constant in accordance with the voltage gain only of the laminated piezoelectric element relating to the actuator 61. The time constant Tpzt may be a variable in accordance with a preferable responsiveness only of the laminated piezoelectric element relating to the actuator 61.

Then, for improving the response of the laminated piezoelectric element, two transfer functions Gff(s) 85, Grf(s) 84 of FIG. 3 are respectively represented by a following formula (5) and a formula (6), based on the actual situation model and the normative situation model.

$$G_{ff}(s) = \frac{G_{pzts}(s)}{G_{pztx}(s)} \qquad (5)$$

$$G_{rf}(s) = K_{mon}G_{pzts}(s) \qquad (6)$$

By respectively setting two transfer functions Gff(s) 85, Grf(s) 84 as to the formula (5) and the formula (6), it is possible to cancel the response delay of the laminated piezoelectric element and to implement the preferable response of the formula (4).

When the formula (3) is utilized for the transfer function of the valve driving circuit 5, the Kmo is utilized for the gain of the analog input circuit 72, and the Gaf(s) is utilized for the transfer function of the voltage feedback compensator 83 in the block line chart of FIG. 3, the transfer characteristic from the input signal Vpi and the dead zone compensation signal Vc to the terminal voltage Vpzt is represented by a following formula (7). It should be noted that the voltage signal Voutint corresponding to the voltage applied to the laminated piezoelectric element of the actuator 61 is excluded from the computation deriving the formula (7), since the voltage signal Voutint does not affect the dynamic characteristic of the flow control system when the flow set value is 0.

$$V_{pzt}(s) = \frac{G_{pzts}(s)}{1 + K_{mon}G_{pzts}(s)G_{af}(s)}V_{pi}(s) + G_{pzts}(s)V_c(s) \qquad (7)$$

When a relationship Gaf(s)=0 is utilized, the formula (7) is represented by a following formula (8).

$$V_{pzt}(s) = G_{pzts}(s)\{V_{pi}(s) + V_c(s)\} \qquad (8)$$

By the formula (8), it is understood that the laminated piezoelectric element rises even from the initial situation in which the applied voltage is 0 V, with the quick response characteristic defined in the normative situation model.

Furthermore, it is understood that the response characteristic of the laminated piezoelectric element can be regulated when a proper transfer function other than 0 is applied to the Gaf(s) in the formula (7).

It should be noted that, when the flow set value is changed from a certain value to a different value, the component of the first expression at the right side of the formula (7) follows to the change of the flow set value and changes to a value corresponding to a necessary valve opening degree. The time waveform of the transient response corresponding to the component of this first expression causes an overshoot in a direction of accelerating the response of the laminated piezoelectric element driving the diaphragm 68, and then becomes a waveform converging at a value of the valve opening degree corresponding to the flow set value after the change. On the other hand, when the flow set value is changed from 0 to a value other than 0, the time waveform of the transient response corresponding to the component of the second expression at the right side of the formula (7)

generates a spike-like signal, and then becomes a waveform converging at a constant value independent from the flow set value.

Next, processes are explained which mounts the digital control system of the above control method.

The Gff(s) 85 of the formula (5) is represented by a following formula (9).

$$G_{ff}(s) = \frac{V_{ff}(s)}{V_u(s)} = \frac{(T_{1\_pzt}s + 1)(T_{2\_pzt}s + 1)}{(T_{com}s + 1)(T_{pzt}s + 1)} \quad (9)$$

However, $$T_{com} = K_{1\_pzt}T_{2\_pzt} + K_{2\_pzt}T_{1\_pzt}$$

For mounting the digital control system, the process of the formula (7) is discretized and the similar response characteristic can be implemented by a following recurrence formula (10). It should be noted that, when the time is t, the value of the modified operation quantity signal Vff is represented by vff[t]. This explanation is similarly applied to the other variables. The arithmetic of the recurrence formula (10) is performed at sample intervals Ts. Thus, when the initial clock is set to be 0, the value of t becomes the integral multiple of Ts. For example, the sample interval Ts is 2 ms.

$$v_{ff}[kT_S] = b_{ffd0}v_u[kT_S] + b_{ffd1}v_u[(k-1)T_S] + b_{ffd2}v_u[(k-2)T_S] - a_{ffd1}v_{ff}[(k-1)T_S] - a_{ffd2}v_{ff}[(k-2)T_S] \quad (10)$$

However,
k=0, 1, 2, . . .
den=$(K_{com}T_S+2T_{com})(T_S+2T_{pzt})$
$b_{ffd0}$=$(T_S+2T_{1\_pzt})(T_S+2T_{2\_pzt})$/den
$b_{ffd1}$={$(T_S+2T_{1\_pzt})(T_S-2T_{2\_pzt})+(T_S-2T_{1\_pzt})(T_S+2T_{2\_pzt})$}/den
$b_{ffd2}$=$(T_S+2T_{1\_pzt})(T_S-2T_{2\_pzt})$/den
$a_{ffd1}$={$(K_{com}T_S+2T_{com})(T_S-2T_{pzt})+(K_{com}T_S-2T_{com})(T_S+2T_{pzt})$}/den
$a_{ffd2}$=$(K_{com}T_S-2T_{com})(T_S-2T_{pzt})$/den On the other hand, the Grf(s) 84 of the formula (6) becomes a following formula (11).

$$G_{rf}(s) = G_{pzts}(s) = \frac{K_{pzt}}{T_{pzt}s + 1} \quad (11)$$

For mounting the digital control system, the process of the formula (11) can implement similar response characteristic by a following recurrence formula (12).

$$v_{rf}[kT_S] = b_{rfd0}v_c[kT_S] + b_{rfd1}v_c[(k-1)T_S] - a_{rfd1}v_{rf}[(k-1)T_S] \quad (12)$$

However,
k=0, 1, 2, . . .
den=$T_S+2T_{pzt}$
$b_{rfd0}$=$K_{pzt}T_S$/den
$b_{rfd1}$=$K_{pzt}T_S$/den
$a_{rfd1}$=$(T_S-2T_{pzt})$/den In addition, the control unit 4 changes the flow control based on whether the flow set value is 0 or is a value other than 0, in order to provide the pressure surely closing the valve of the valve unit 6 to the diaphragm 68. Based on whether the flow set value is 0 or is a value other than 0, the control unit 4 sets a signal with respect to the output signal Vout for the valve driving circuit 5, the signal being the voltage signal Voutint making the voltage applied to the laminated piezoelectric element become 0 V or the signal in which the modified operation quantity signal Vff is added to the voltage signal Voutint.

if ($v_{sp}[kT_S]$=0),
then $v_{out}[kT_S]$=$v_{out\ int}$
else $v_{out}[kT_S]$=$v_{ff}[kT_S]$+$v_{out\ int}$
However, k=0, 1, 2, . . .

A Vsp is a flow set signal.

In addition, when the flow set value is a value other than 0, the control unit 4 adds a signal Vc Voutthd−Voutint) of the constant voltage value corresponding to a dead zone required for the pressurization of the valve of the valve unit 6, to the operation quantity signal Vu in consideration of the voltage feedback signal based on the terminal voltage Vpzt.

if ($v_{sp}[kT_S]$=0),
then $v_u[kT_S]$=$v_u[kT_S]$
else $v_u[kT_S]$=$v_u[kT_S]$+$v_{outthd}$−$v_{out\ int}$
However, k=0, 1, 2, . . .

The Voutthd is a signal making the voltage applied to the laminated piezoelectric element become the open/close boundary voltage. Thus, the linearity between input-output signals of the control unit 4 is kept, and the uniform flow control characteristic can be obtained for the flows, from a lesser flow to a greater flow. Thus, the Grf(s) is useful for keeping the linearity between the input-output signals of the control unit 4.

In the above explanation, the primary delay element represented by the formula (4) is utilized as the transfer function of the normative situation model. However, the transfer function of the normative situation model is not limited to the primary delay element. For example, the secondary delay element may be utilized as the transfer function of the normative situation model, needless to say. For example, a greater value is set to the natural angular frequency ω of the secondary delay element in that case, in consideration of the great capacitance of the laminated piezoelectric element.

Figure 5:
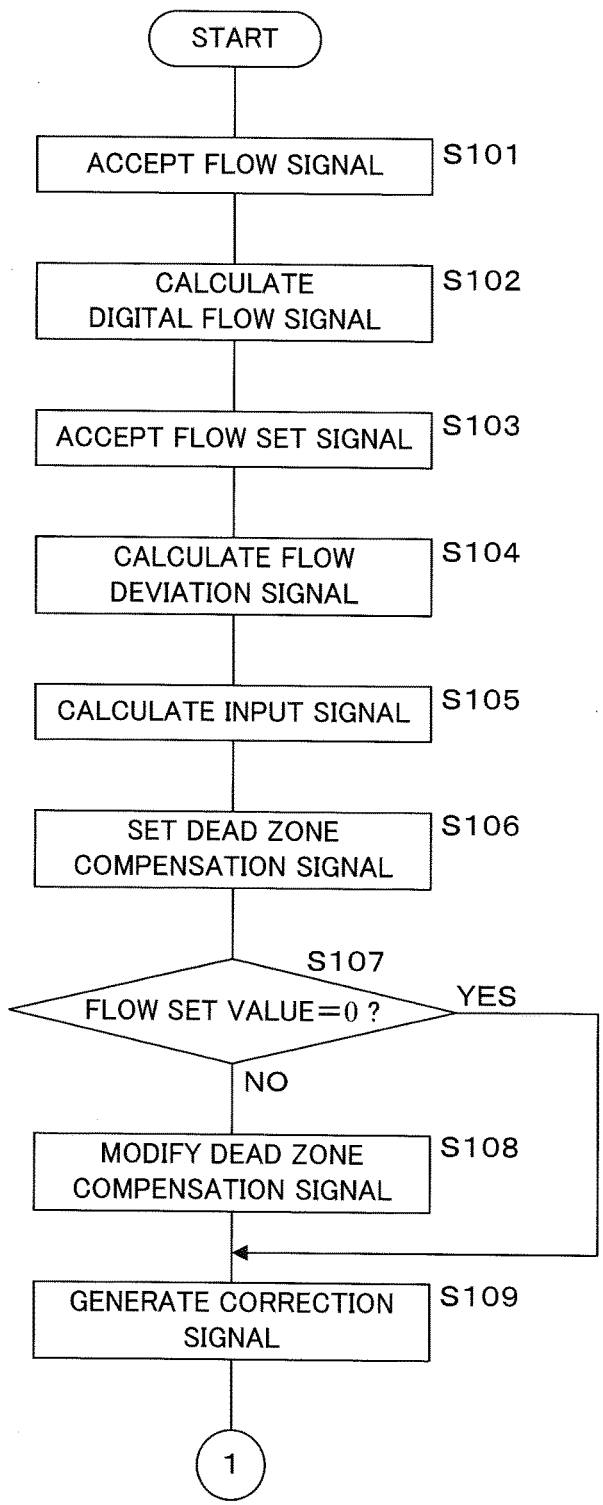
FIG. 5 is a flowchart illustrating an example of a procedure of processes executed by the control unit.
Figure 6:
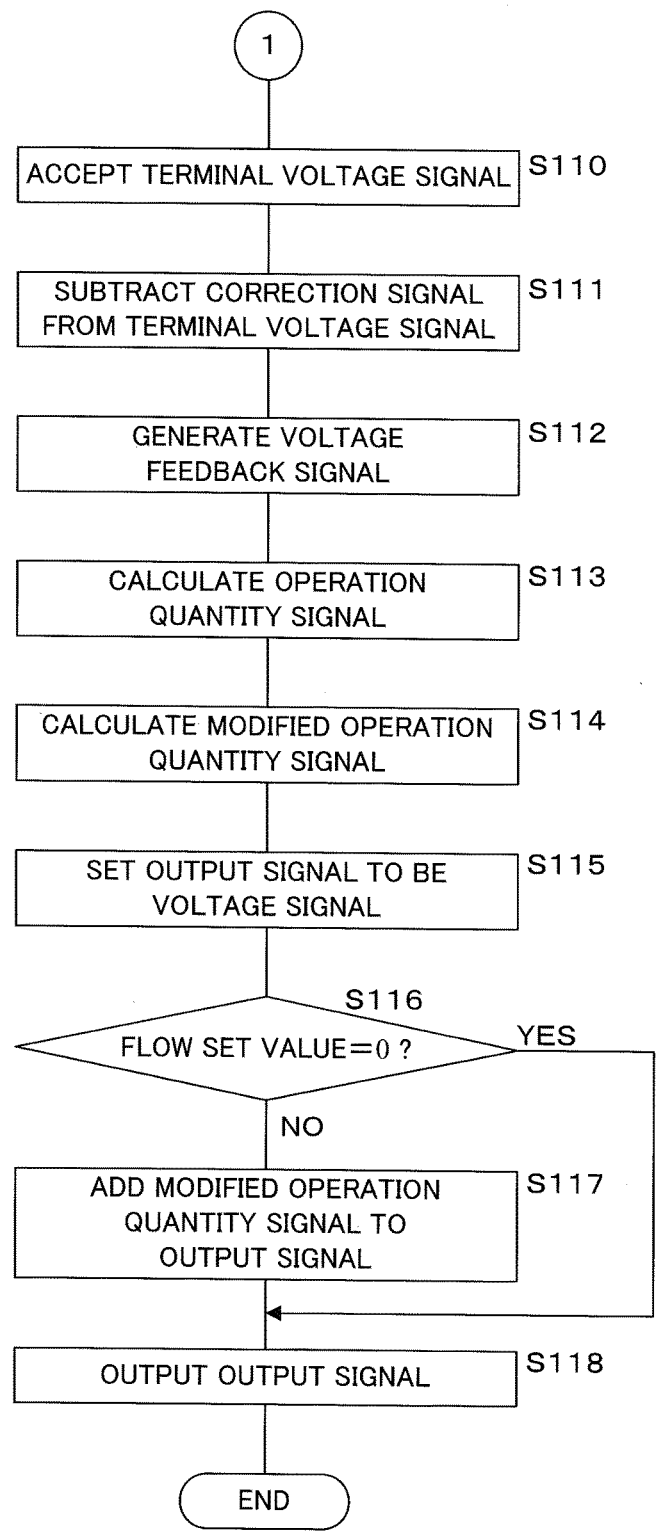
FIG. 6 is a flowchart illustrating an example of a procedure of processes executed by the control unit.
Figure 7A:
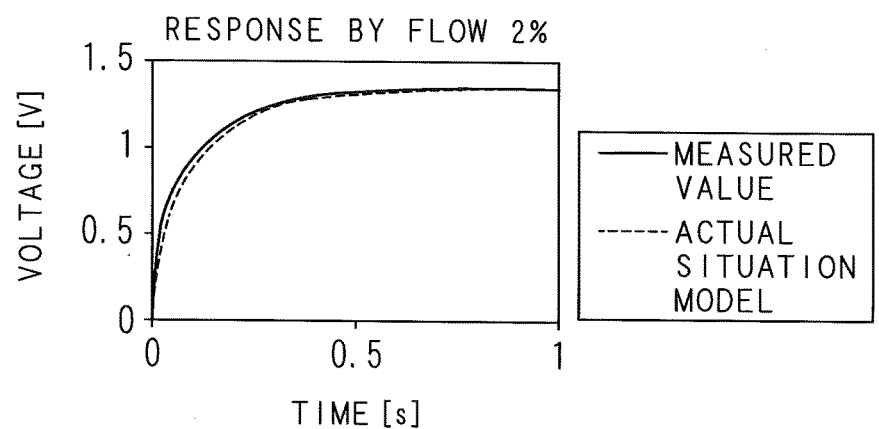
FIG. 7A is an explanation view illustrating an example of a time response waveform of an actuator when a voltage in accordance with an input waveform in a step-like manner is applied to an input terminal of a valve driving circuit.
Figure 7B:
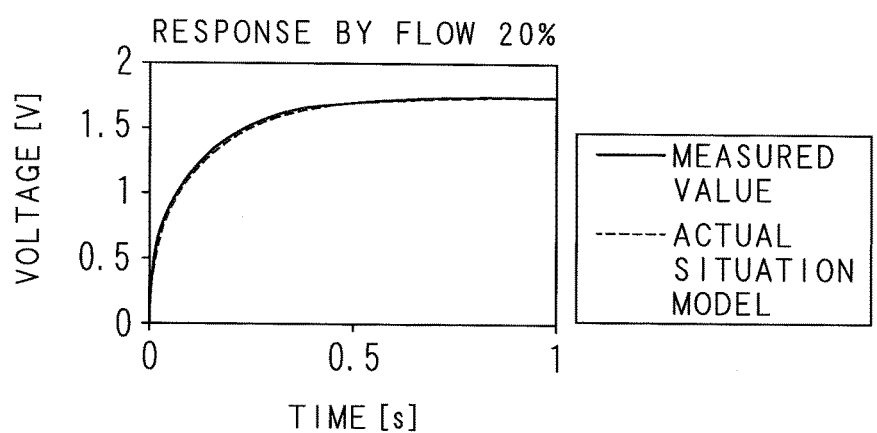
FIG. 7B is an explanation view illustrating an example of the time response waveform of the actuator when the voltage in accordance with the input waveform in the step-like manner is applied to the input terminal of the valve driving circuit.
Figure 7C:
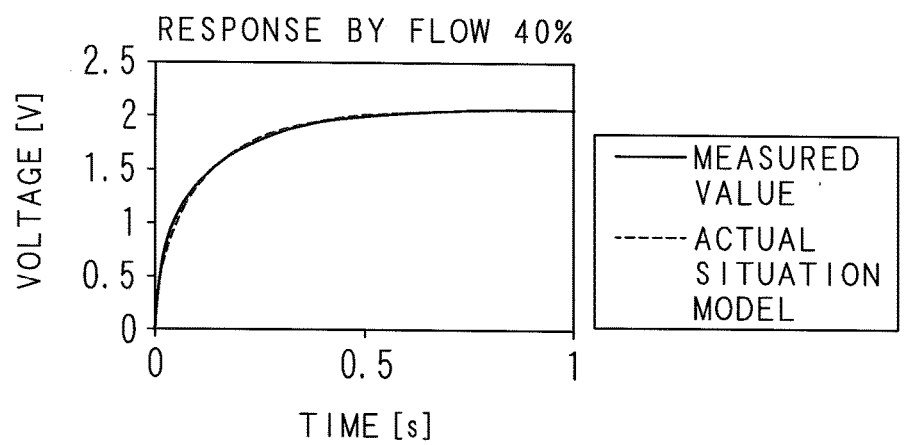
FIG. 7C is an explanation view illustrating an example of the time response waveform of the actuator when the voltage in accordance with the input waveform in the step-like manner is applied to the input terminal of the valve driving circuit.
Figure 7D:
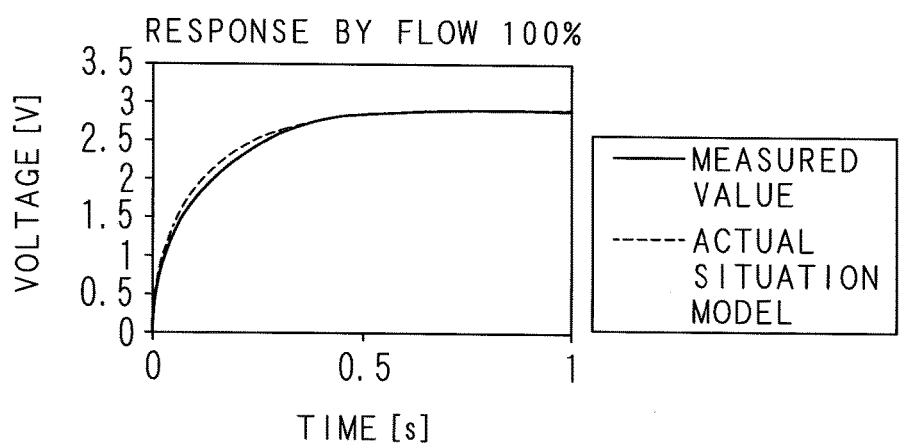
FIG. 7D is an explanation view illustrating an example of the time response waveform of the actuator when the voltage in accordance with the input waveform in the step-like manner is applied to the input terminal of the valve driving circuit.

FIG. 5 and FIG. 6 are flowcharts illustrating an example of a procedure of processes executed by the control unit 4. FIG. 5 and FIG. 6 illustrate a routine interrupt process in a case where the control unit 4 including a computer executes a function of a corresponding circuit illustrated in the broken line region of FIG. 3.

The CPU 41 generates the interrupt process at the constant intervals Ts, based on the date and time accepted from the timer 44, and executes repeatedly the processes illustrated in FIG. 5 and FIG. 6.

The CPU 41 accepts a flow signal from the sensor unit 3 through the input-output interface 45 and the AD/DA converter 46 (step S101). This flow signal is a signal in which the analog flow signal Vqc is subjected to the digital conversion. On the accepted flow signal, the CPU 41 performs the digital filter process to correct the frequency characteristic, so as to calculate the digital flow signal Vqd (step S102).

The CPU 41 accepts the flow set signal Vsp from the host computer H through the input-output interface 45 (step S103). The CPU 41 calculates the flow deviation signal Ve from the flow set signal Vsp and the digital flow signal Vqd (step S104). On the calculated flow deviation signal Ve, the CPU 41 executes the computation of the proportional integral compensation, to calculate the input signal Vpi (step S105).

The CPU 41 sets the dead zone compensation signal Vc to be 0 (step S106). The CPU 41 determines whether the flow set value corresponding to the flow set signal Vsp is 0 or not (step S107). When having determined that the flow set value corresponding to the flow set signal Vsp is 0 (step S107: YES), the CPU 41 proceeds the processes to the step S109. When having determined that the flow set value corresponding to the flow set signal Vsp is not 0 (step S107: NO), the CPU 41 modifies the dead zone compensation signal Vc to be the difference between the Voutthd and the Voutint (step S108).

It should be noted that the Voutint is the output signal Vout making the voltage applied to the laminated piezoelectric element become 0 V. The Voutthd is the output signal Vout making the voltage applied to the laminated piezoelectric element become the open/close boundary voltage.

The CPU 41 executes the digital filter computation corresponding to the transfer function Grf(s) 84 based on the set or modified dead zone compensation signal Vc, to generate the correction signal Vrf (step S109). The CPU 41 accepts the terminal voltage signal Vmon from the valve driving circuit 5 (step S110). The CPU 41 subtracts the generated correction signal Vrf from the accepted terminal voltage signal Vmon (step S111). The CPU 41 executes the computation corresponding to the transfer function Gaf(s) of the voltage feedback compensator 83 based on the signal obtained by the subtraction at the step S111, to generate the voltage feedback signal (step S112).

The CPU 41 adds the dead zone compensation signal Vc to the input signal Vpi that is the proportional integral compensation output calculated at the step S105, and subtracts the voltage feedback signal generated at the step S112 from the addition result, to calculate the operation quantity signal Vu (step S113). The CPU 41 executes the computation corresponding to the transfer function Gff(s) 85 on the operation quantity signal Vu, to calculate the modified operation quantity signal Vff that compensates the response delay (step S114).

Then, the CPU 41 sets the output signal Vout that is outputted from the AD/DA converter 46 and inputted into the valve driving circuit 5. At first, the CPU 41 sets the output signal Vout to be the voltage signal Voutint corresponding to the case where the terminal voltage Vpzt becomes 0 V (step S115). The CPU 41 determines whether the flow set value corresponding to the flow set signal Vsp is 0 or not (step S116). When having determined that the flow set value corresponding to the flow set signal Vsp is 0 (step S116: YES), the CPU 41 proceeds the processes to the step S118. When having determined that the flow set value corresponding to the flow set signal Vsp is not 0 (step S116: NO), the CPU 41 adds the modified operation quantity signal Vff to the output signal Vout (step S117). The CPU 41 outputs the output signal Vout from the AD/DA converter 46 (step S118), and ends the processes.

It should be noted that, when the terminal voltage Vpzt is not utilized for the feedback control of the flow control system, the processes from the step S109 to the step S112 in FIG. 5 and FIG. 6 are deleted. In addition, when the terminal voltage Vpzt is not utilized for the feedback control of the flow control system, the CPU 41 adds the dead zone compensation signal Vc to the input signal Vpi that is the calculated proportional integral compensation output, to calculate the operation quantity signal Vu at the step S113.

At the step S107 and the step S116, the CPU 41 is explained to determine whether the flow set value corresponding to the flow set signal Vsp is 0 or not. However, the CPU 41 may determine whether the flow set value corresponding to the flow set signal Vsp is below a predetermined value or not, and execute the subsequent processes based on the determination result.

Next, the actuation of the flow control apparatus 1 is explained.

FIG. 7A, FIG. 7B, FIG. 7C, and FIG. 7D are explanation views illustrating an example of the time response waveform of the laminated piezoelectric element when the voltage in accordance with the input waveform in the step-like manner is applied to the input terminal of the valve driving circuit 5. FIG. 7A, FIG. 7B, FIG. 7C, and FIG. 7D respectively illustrates the response waveforms of the laminated piezoelectric element when the flow set value is changed to be 2%, 20%, 40%, and 100% of the maximum value of the flow set value. A solid line indicates an actually measured response waveform. A broken line indicates a response waveform of the actual situation model. The horizontal axis of FIG. 7A, FIG. 7B, FIG. 7C and FIG. 7D indicates time whose unit is a second. The vertical axis of FIG. 7A, FIG. 7B, FIG. 7C and FIG. 7D indicates a voltage whose unit is a volt, and in which the gain Kmon is multiplied on the terminal voltage Vpzt being the output voltage from the valve driving circuit 5. For example, each constant value of the actual situation model in FIG. 7A, FIG. 7B, FIG. 7C and FIG. 7D is as described below.

Kpzt=44.3

K1_pzt=2.15/3.6=0.694, T1_pzt=0.158

K2_pzt=1.45/3.6=0.306, T2_pzt=0.044

By FIG. 7A, FIG. 7B, FIG. 7C and FIG. 7D, it is found that the actual situation model properly reproduces the actually measured response characteristic of the actuator 61 for each flow set value.

Figure 8:
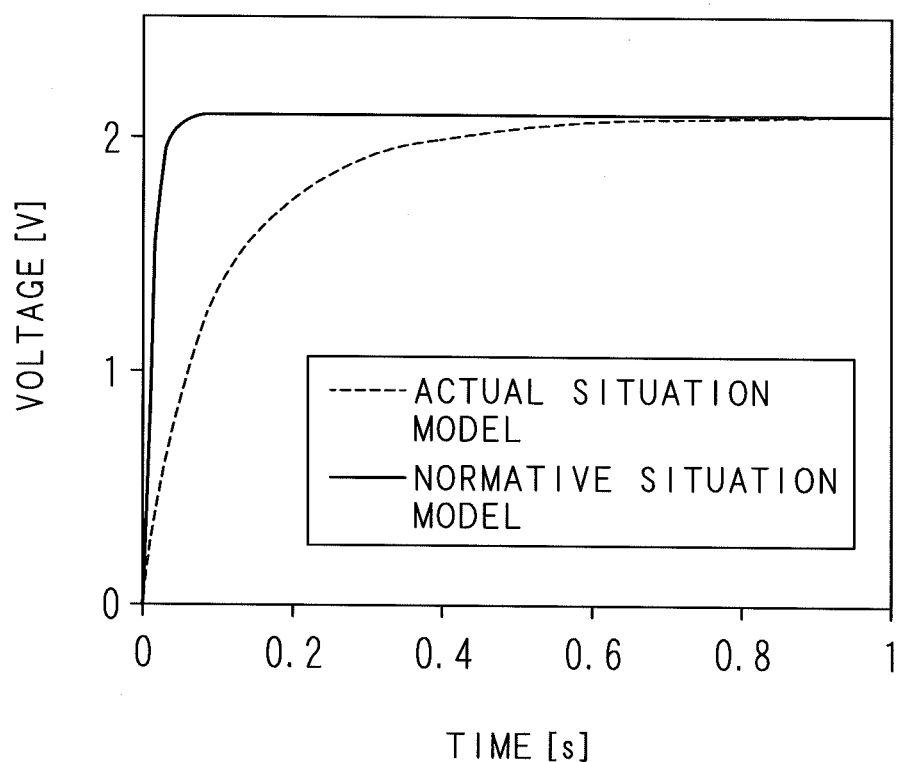
FIG. 8 is an explanation view illustrating an example of the time response waveform of the actuator as to an actual situation model and a normative situation model when the voltage in accordance with the input waveform in the step-like manner is applied to the input terminal of the valve driving circuit.

FIG. 8 is an explanation view illustrating an example of the time response waveform of the piezoelectric element as to an actual situation model and a normative situation model when the voltage in accordance with the input waveform in the step-like manner is applied to the input terminal of the valve driving circuit 5. The horizontal axis and the vertical axis of FIG. 8 are respectively the same as the horizontal axis and the vertical axis of FIG. 7. The time constant Tpzt being a parameter of the normative situation model is as described below:

Tpzt=0.012

The solid line indicates a response waveform of the normative situation model. The broken line indicates a response waveform of the actual situation model. From FIG. 8, it is found that the normative situation model induces the response much quicker than the response of the actual situation model.

Figure 9A:
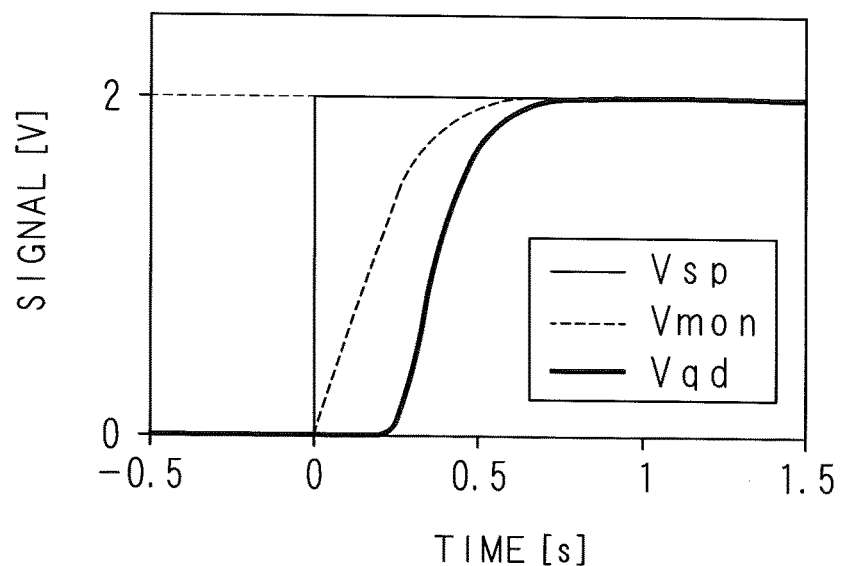
FIG. 9A is an explanation view illustrating an example of the response waveform when a flow set signal Vsp corresponding to a flow set value rises from 0 V to 2 V in a step-like manner.

FIG. 9A. FIG. 9B, FIG. 10A, FIG. 10B, FIG. 11A and FIG. 11B are explanation views illustrating an example of the response waveform when the flow set signal Vsp corresponding to the flow set value rises from 0 V to 2 V in a step-like manner. The horizontal axis of FIG. 9A to FIG. 11B indicates time whose unit is a second. The vertical axis of FIG. 9A to FIG. 11B indicates a signal whose unit is a volt.

Figure 10A:
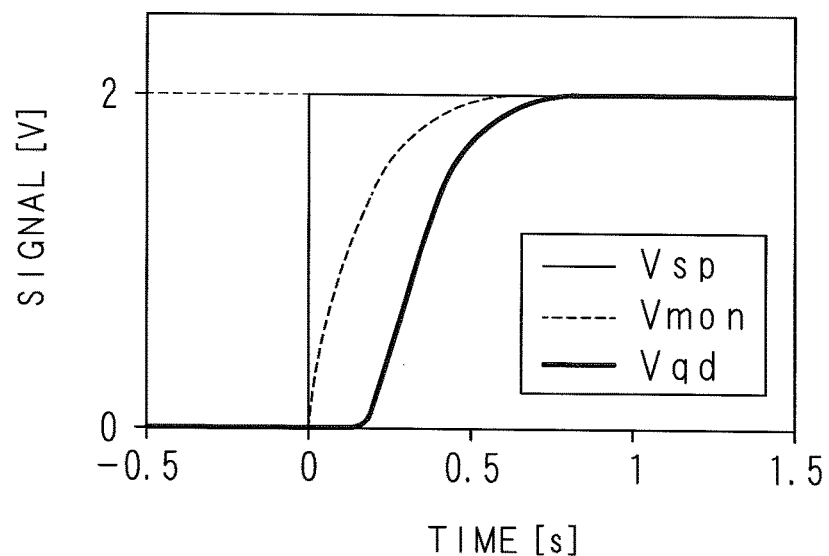
FIG. 10A is an explanation view illustrating an example of the response waveform when the flow set signal Vsp corresponding to the flow set value rises from 0 V to 2 V in the step-like manner.
Figure 11A:
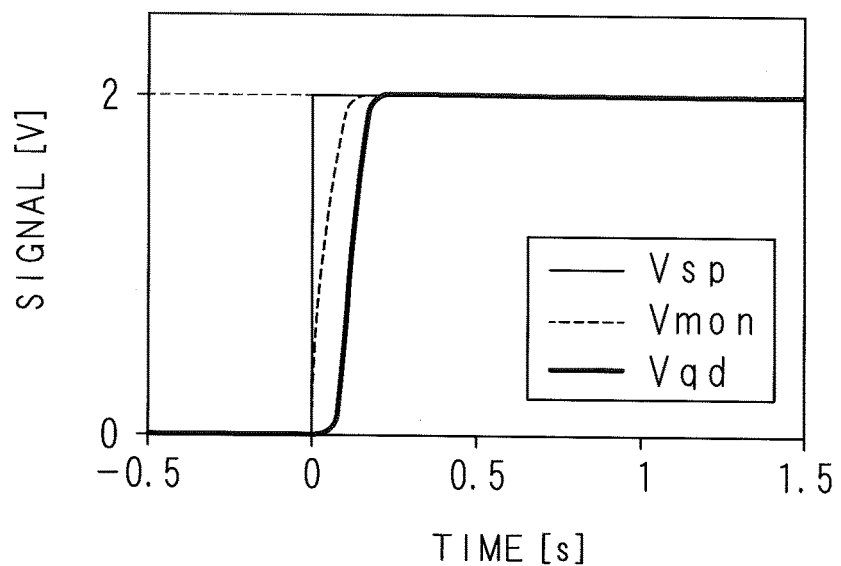
FIG. 11A is an explanation view illustrating an example of the response waveform when the flow set signal Vsp corresponding to the flow set value rises from 0 V to 2 V in the step-like manner.

In FIG. 9A, FIG. 10A and FIG. 11A, a thin solid line indicates a step waveform of the flow set signal Vsp. A broken line indicates a response waveform of the terminal voltage signal Vmon proportional to the terminal voltage Vpzt. A thick solid line indicates a response waveform of the digital flow signal Vqd. The response waveform of the terminal voltage signal Vmon corresponds to the response of the laminated piezoelectric element relating to the actuator 61. As the result of the control, the response waveform of the digital flow signal Vqd corresponds to the response of the flow that is actually flowing in the flow channel portion 2.

Figure 9B:
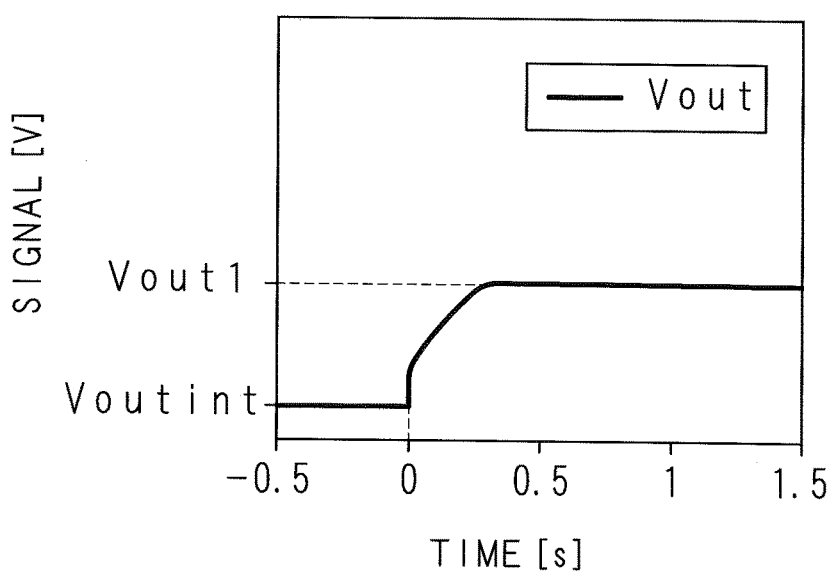
FIG. 9B is an explanation view illustrating an example of the response waveform when the flow set signal Vsp corresponding to the flow set value rises from 0 V to 2 V in the step-like manner.
Figure 10B:
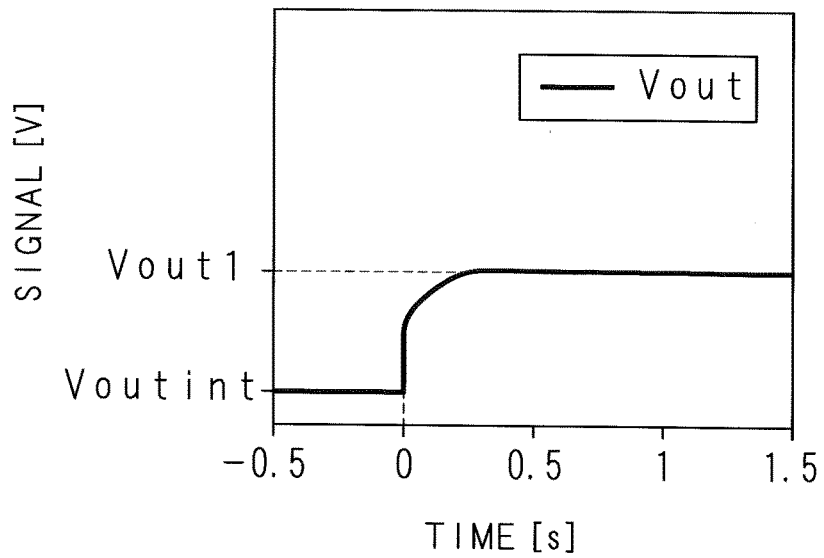
FIG. 10B is an explanation view illustrating an example of the response waveform when the flow set signal Vsp corresponding to the flow set value rises from 0 V to 2 V in the step-like manner.
Figure 11B:
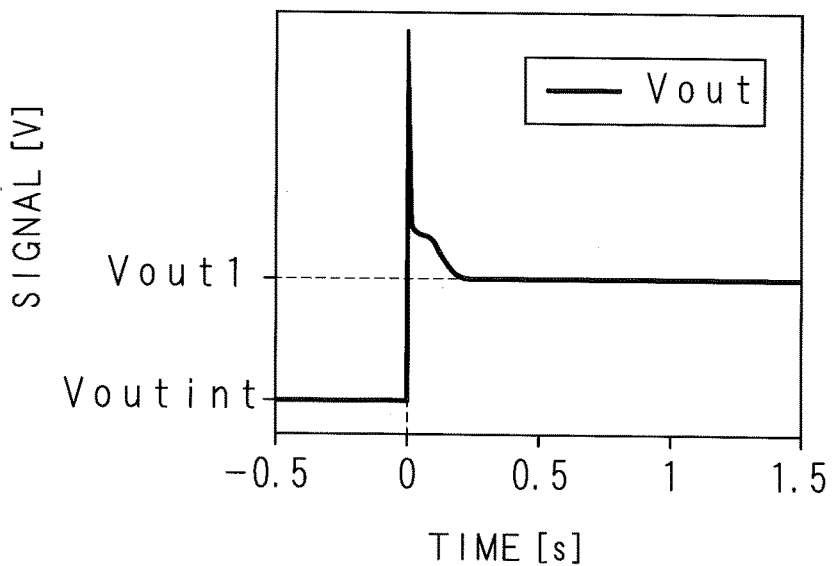
FIG. 11B is an explanation view illustrating an example of the response waveform when the flow set signal Vsp corresponding to the flow set value rises from 0 V to 2 V in the step-like manner.

The thick solid line of FIG. 9B, FIG. 10B and FIG. 11B indicates the response waveform of the output signal Vout from the AD/DA converter 46, i.e., the response waveform of input signal into the valve driving circuit 5. It should be noted that the Vout1 of the vertical axis in FIG. 9B, FIG. 10B and FIG. 11B indicates the steady-state value of the output signal Vout that is inputted into the valve driving circuit 5 when the flow set signal Vsp is 2V.

FIG. 9A, FIG. 9B, FIG. 10A, FIG. 10B, FIG. 11A and FIG. 11B illustrate differences of the response waveform based on the difference of configuration elements in the flow control system. FIG. 9A and FIG. 9B illustrate the response wave forms of the flow control system consisting of only the configuration elements of the proportional integration control. FIG. 10A and FIG. 10B illustrate the response wave forms of the flow control system in the case where the dead zone compensation voltage is applied to the valve unit 6 at the time of rising from a condition in which the valve of the valve unit 6 is closed, in addition to the proportional integration control. FIG. 11A and FIG. 11B illustrate the response waveforms in the case where the computation of compensating the response delay is executed by the transfer function Gff(s) 85 on the operation quantity signal Vu, in addition to the proportional integration control and the control based on the dead zone compensation voltage. In short, FIG. 11A and FIG. 11B illustrate the response waveform of the flow control apparatus 1 according to the embodiment 1.

When the note is made of the response waveform of the digital flow signal Vqd in FIG. 9A, FIG. 10A and FIG. 11A, it is found that no response time in FIG. 9A is about 0.2 seconds and the later reaching to the flow set value requires about 0.7 seconds. One of the reasons why the rising of the digital flow signal Vqd requires about 0.7 seconds is that the removing of pressurization applied to the valve of the valve unit 6 requires time before the valve becomes in the open/close boundary condition.

In FIG. 10A, no response time of the digital flow signal Vqd is about 0.15 seconds, and the later reaching to the flow set value requires about 0.7 seconds. The no response time of FIG. 10A is shortened a little greater than the no response time of FIG. 9A. The reason is considered to be that the valve of the valve unit 6 is opened at one time to be the open/close boundary condition by the dead zone compensation voltage. However, when the dead zone compensation voltage is increased for further shortening the no response time, the overshoot is caused. On the other hand, when the dead zone compensation voltage is decreased for suppressing the overshoot, the response becomes slower. Thus, there is a dilemma.

In FIG. 11A, the no response time of the digital flow signal Vqd is shortened to be below 0.1 second, and the time of later reaching to the flow set value is shortened to be about 0.2 seconds. In the flow control apparatus 1 corresponding to FIG. 11A, the valve of the valve unit 6 is opened more quickly than at the period before the open/close boundary condition is present. At the same time, the digital flow signal Vqd reaches more quickly to the value corresponding to the flow set value without the overshoot.

When compared with FIG. 9B, FIG. 10B and FIG. 11B, the time when the output signal Vout reaches to the Vout1 of the steady-state value is about 0.25 seconds in FIG. 9B and FIG. 10B. The comparison of the waveform of FIG. 9B with the waveform of FIG. 10B shows that the rising voltage immediately after 0 second in FIG. 10B is higher. The reason is considered to be that the effects of the dead zone compensation voltage is expressed as the waveform.

On the other hand, in FIG. 11B, the time when the output signal Vout reaches to the Vout1 of the steady-state value is very short. The output signal Vout converges at the Vout1, 0.2 to 0.25 seconds after the rising. This change of the output signal Vout implements the quick response observed in FIG. 11A.

The response waveform immediately after the rising in FIG. 11B has a spike-like projection when the flow set value is increased in the step-like manner. The reason is that the second expression at the right side of the formula (7) generates a spike-like signal attenuated with the short time constant Tpzt in the normative situation model. Thus, the rising of the terminal voltage Vpzt is accelerated, and the no response time spent for passing the dead zone is shortened. In other words, the shortening in the no response time of the digital flow signal Vqd of FIG. 11A is related to the effect of the second expression at the right side of the formula (7).

The spike-like signal of FIG. 11B indicates that a great electrical current is supplied in a short time to the laminated piezoelectric element having the great capacitance, and the spike-like signal corresponds to the actuation of the valve of the valve unit 6 opened at one time to be in the open/close boundary condition.

In FIG. 11B, a shoulder-like small peak is found near the 0.07 seconds portion after the spike-like response waveform is attenuated. This is caused by the first expression at the right side of the formula (7) that generates a signal overshooting in a direction enhancing the response in accordance with the change of the flow set value. Thus, the terminal voltage signal Vmon and the digital flow signal Vqd in FIG. 11A quickly reach to values corresponding to a new flow set value. In other words, the steep gradients found on the waveforms of the terminal voltage signal Vmon and the digital flow signal Vqd at the rising time of FIG. 11A are related to the effect of the first expression at the right side of the formula (7).

The small overshoot in FIG. 11B corresponds to the actuation of the valve of the valve unit 6 that is rapidly opened from the open/close boundary condition to a desired valve opening degree by the great amount of, but not excessive, electrical current supplied to the laminated piezoelectric element. The waveform in FIG. 11B is rapidly converged at the constant value. Therefore, the flow control apparatus 1 suppresses the valve of the valve unit 6 from being opened too much over the desired valve opening degree.

The waveform of the electrical current flowing to the laminated piezoelectric element has a shape correlative to or approximately similar to the waveform in FIG. 11B. When a great amount of electrical current corresponding to the spike-like response waveform of FIG. 11B flows into the laminated piezoelectric element, the laminated piezoelectric element quickly starts the response. In addition, when the electrical current corresponding to the overshooting response waveform of FIG. 11B flows into the laminated piezoelectric element, the laminated piezoelectric element rapidly stretches from the rising time.

It should be noted that the flow control apparatus 1 induces the response waveform similar to FIG. 11, even when the flow set value is decreased in the step-like manner. At that time, the varying direction of the signal on the vertical axis becomes reverse. However, effects similar to the effects described above can be obtained.

The flow control apparatus 1 controls the flow by the digital control based on the program 1P. However, the control unit 4 may be replaced with an analog circuit configuring the transfer function. Even at that case, effects similar to the effects described above can be obtained.

In the embodiment 1, the PI control is performed on the flow deviation signal Ve. However, the flow deviation signal Ve may be processed by the PID control, the PI-D control, the I-PD control or the like.

With the flow control apparatus 1, it is possible to implement the quick response control without the overshoot.

The flow control apparatus 1 shortens the response delay caused by the great electrical capacitance of the laminated piezoelectric element, to implement the quicker response control of the flow. Therefore, it is possible to improve the manufacturing efficiency of the product by the utilization of the flow control apparatus 1.

Embodiment 2

Embodiment 2 relates to a form in which a reduction filter is added to the flow control system, the reduction filter reducing the spike-like voltage change corresponding to the signal that is outputted from the control unit 4 to the valve driving circuit 5.

It should be noted that components of embodiment 2 similar to the components of embodiment 1 are provided with the same reference numbers, and the detailed explanations of the same components are omitted.

Figure 12:
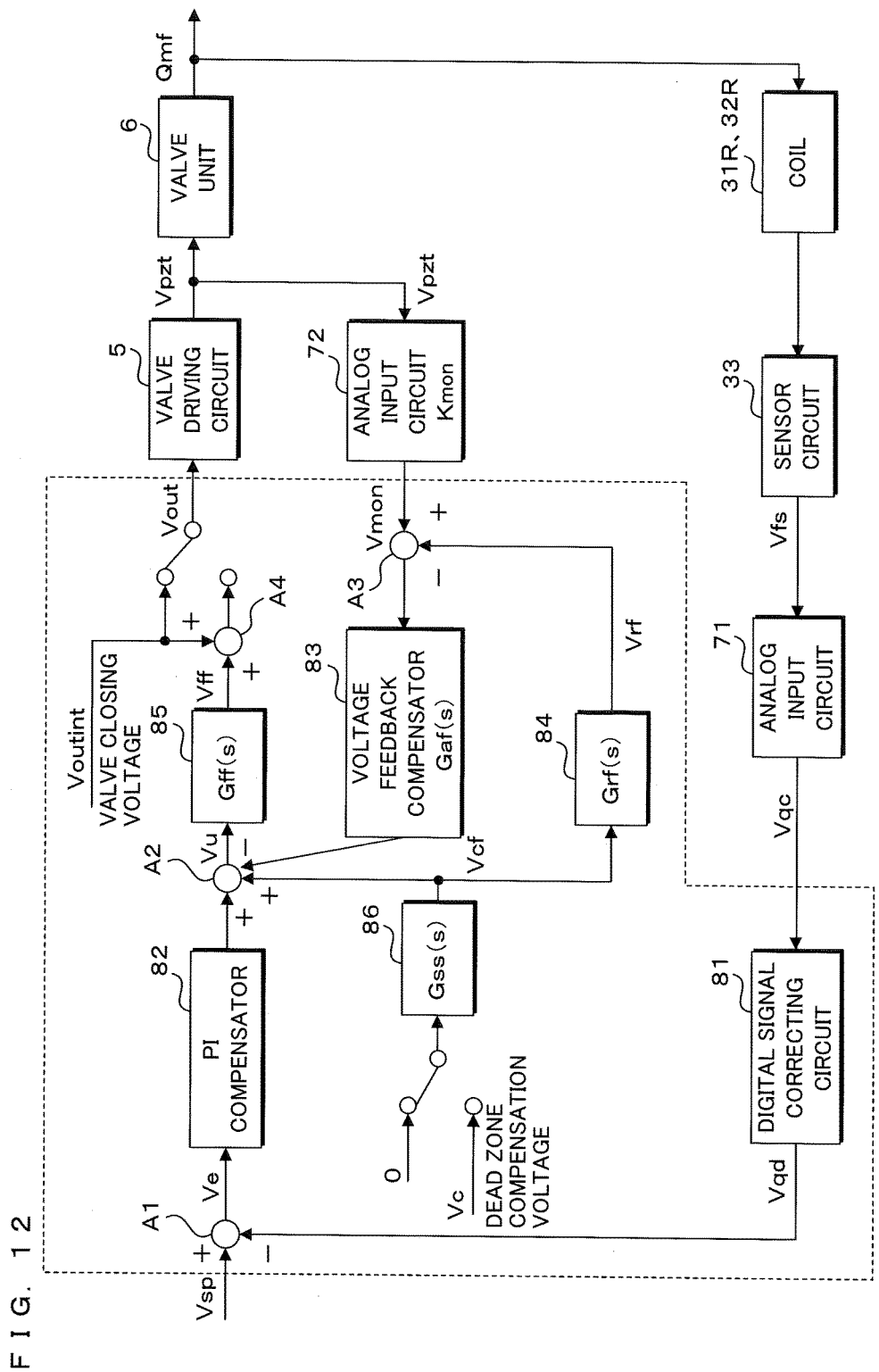
FIG. 12 is a block line chart illustrating another example of the flow control system.

FIG. 12 is a block line chart illustrating another example of the flow control system. FIG. 12 is a block line chart in which the transfer function Gss(s) (reducing means) 86 is added to the FIG. 3. The transfer function Gss(s) 86 is a function for regulating the response characteristic of the flow control system at the time when the valve unit 6 is opened from the closed condition. In FIG. 12, the control unit 4 corresponds to the element group of the region surrounded by the broken line.

An different actuating part of FIG. 12 from FIG. 3 is a part where a signal in which 0 and dead zone compensation voltage Vc are selectively switched is subjected to the reduction process by the transfer function Gss(s) 86 corresponding to the reduction filter, and the signal Vcf subjected to the reduction process is inputted into the summing point A2 and the transfer function Grf(s) 84.

Figure 13:
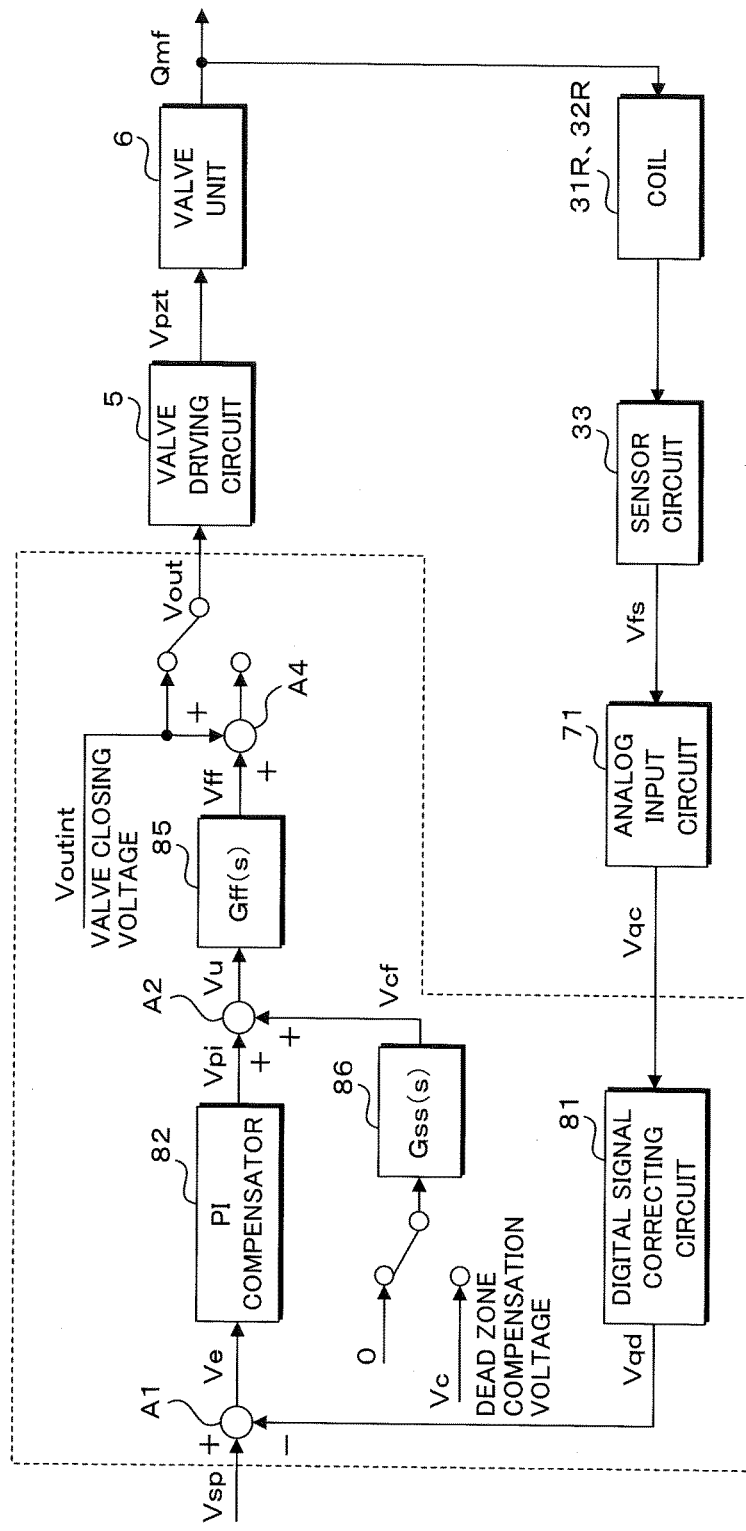
FIG. 13 is a block line chart illustrating another example of the flow control system.

FIG. 13 is a block line chart illustrating another example of the flow control system. FIG. 13 is a block line chart in which the transfer function Gss(s) 86 is added to FIG. 4. In FIG. 13, the control unit 4 corresponds to the element group of the region surrounded by the broken line.

An different actuating part of FIG. 13 from FIG. 4 is a part where a signal in which 0 and dead zone compensation voltage Vc are selectively switched is subjected to the reduction process by the transfer function Gss(s) 86 corresponding to the reduction filter, and the signal Vcf subjected to the reduction process is inputted into the summing point A2.

Next, the transfer function model of the control unit 4 is explained.

The transfer characteristic from the input signal Vpi and the dead zone compensation signal Vc to the terminal voltage Vpzt is represented by a following formula (13).

$$V_{pzt}(s) = \frac{G_{pzts}(s)}{1 + K_{mon}G_{pzts}(s)G_{af}(s)} V_{pi}(s) + G_{pzts}(s)G_{SS}(s)V_C(s) \quad (13)$$

When a relationship Gaf(s)=0 is utilized, the formula (13) is represented by a following formula (14).

$$v_{pzt}(s) = G_{pzts}(s)\{v_{pi}(s) + G_{ss}(s)V_c(s)\} \quad (14)$$

The transfer function Gss(s) 86 contained in the component of the second expression at the right side of the formula (13) has a function of suppressing the peak voltage of the spike-like signal generated with the formula (7) in the embodiment 1. Thus, when the flow set value is changed from 0 to a value other than 0, the time waveform of the transient response corresponding to the second expression at the right side of the formula (13) quickly rises in the step-like manner toward the voltage that is greater than a voltage corresponding to the flow set value and lower than the peak voltage described above, and then becomes a waveform converging at the constant value independent from the flow set value. In other words, since the transfer function Gss(s) 86 suppresses the peak voltage corresponding to the spike-like projecting waveform, the time waveform described above becomes in a step-like shape but not a spike-like shape.

In the configuration of FIG. 3, when the flow set value is a value other than 0, the control unit 4 adds the signal Vc (Voutthd−Voutint) of the constant voltage value corresponding to the dead zone required for the pressurization of the valve of the valve unit 6, to the operation quantity signal Vu in consideration of the voltage feedback signal based on the terminal voltage Vpzt.

On the other hand, in the configuration of FIG. 12, the control unit 4 performs the reduction process on the signal Vc by the transfer function Gss(S) 86 corresponding to the reduction filter, to rise the signal Vc (Voutthd−Voutint) in the step-like manner, the signal Vc of the constant voltage value corresponding to the dead zone required for the pressurization of the valve of the valve unit 6. Then, the control unit 4 generates the signal Vcf after the reduction process. When the flow set value is a value other than 0, the control unit 4 then adds the generated signal Vcf to the operation quantity signal Vu in consideration of the voltage feedback signal based on the terminal voltage Vpzt. At that time, the control unit 4 generates the voltage feedback signal in consideration of the terminal voltage Vpzt, and of the correction signal Vrf in which the signal Vcf is corrected by the transfer function Grf(s) 84.

Although the configuration of FIG. 3 takes into account of the voltage feedback signal, the configuration of FIG. 4 does not take into account of the voltage feedback signal. Similarly, the configuration of FIG. 12 takes into account of the voltage feedback signal, the configuration of FIG. 13 does not take into account of the voltage feedback signal. In other words, the configuration of FIG. 13 adds the generated signal Vcf to the operation quantity signal Vu that does not take into account of the voltage feedback signal.

For example, a phase delay element of the following formula (15) may be utilized as the Gss(s) 86.

$$G_{SS}(s) = \frac{V_{cf}(s)}{V_C(s)} = \frac{T_{cfn}s + 1}{T_{cfd} + 1} \quad (15)$$

When the digital control system is utilized for the mounting, the process of the formula (15) can implement the similar response characteristic by a following recurrence formula (16).

$$v_{cf}[kT_S]=b_{ss0}v_c[kT_S]+b_{ss1}v_c[(k-1)T_S]+a_{ss1}v_{cf}[(k-1)T_S] \quad (16)$$

Figure 14A:
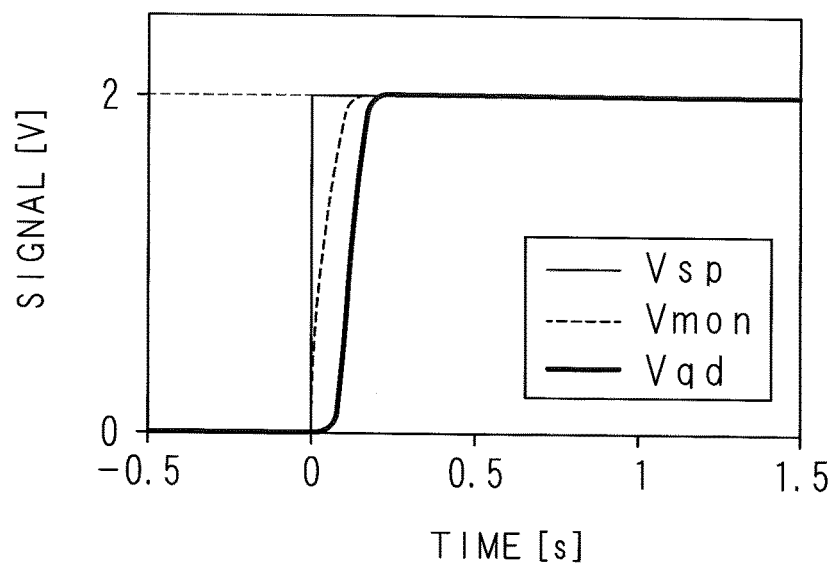
FIG. 14A is an explanation view illustrating an example of the response waveform when the flow set signal Vsp corresponding to the flow set value rises from 0 V to 2 V in the step-like manner.
Figure 14B:
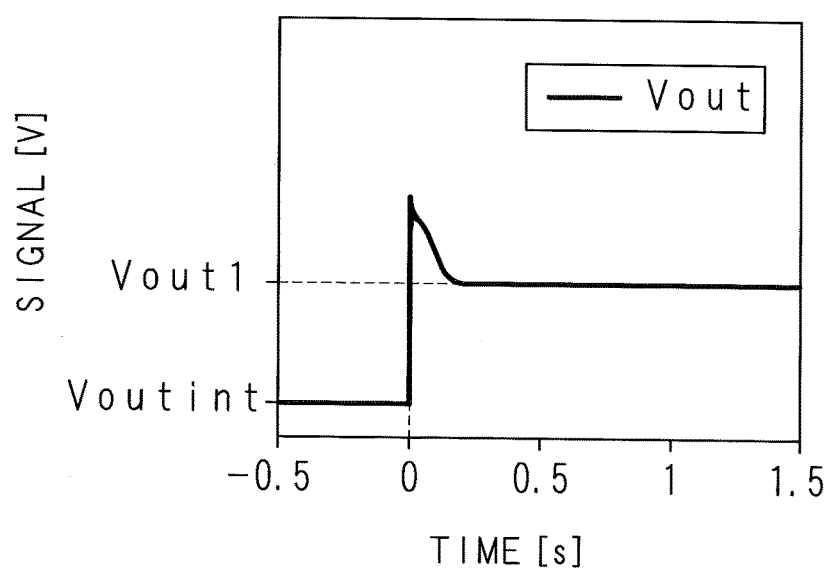
FIG. 14B is an explanation view illustrating an example of the response waveform when the flow set signal Vsp corresponding to the flow set value rises from 0 V to 2 V in the step-like manner.

However,
k=0, 1, 2, . . .
den=$T_S+2T_{cfd}$
$b_{ss0}$=$T_S+2T_{cfn}$/den
$b_{ss1}$=$T_S+2T_{cfn}$/den
$a_{ss1}$=$T_S+2T_{cfn}$/den FIG. 14A and FIG. 14B are explanation views illustrating an example of the response waveform when the flow set signal Vsp corresponding to the flow set value rises from 0 V to 2 V in the step-like manner. The horizontal axis of FIG.

14A and FIG. 14B indicates time whose unit is a second. The vertical axis of FIG. 14A and FIG. 14B indicates a signal whose unit is a volt. The types of lines respectively indicating the flow set signal Vsp, the terminal voltage signal Vmon and the digital flow signal Vqd in FIG. 14A are the same as those in FIG. 9A, FIG. 10A and FIG. 11A. In addition, the thick solid line indicating the output signal Vout in FIG. 14B is the same as the thick solid lines in FIG. 9B, FIG. 10B and FIG. 11B. Furthermore, the Vout1 of the vertical axis in FIG. 14B is a steady-state value of the output signal Vout that is inputted into the valve driving circuit 5 when the flow set signal Vsp is 2V. FIG. 11A and FIG. 14B shows, when compared with FIG. 9A to FIG. 11B, the difference of the response waveform caused by the difference of configuration elements in the flow control system.

FIG. 14A and FIG. 14B illustrate response waveforms when the reduction process is performed on the dead zone compensation voltage Vc at the time of opening the valve unit 6 that is closed in the pressurization condition, in addition to the proportional integration control, the control with the dead zone compensation voltage Vc, and the control with the response delay compensation on the operation quantity signal Vu. In short, FIG. 14A and FIG. 14B illustrate the response waveforms of the flow control apparatus 1 relating to the embodiment 2.

In comparison with the cases of FIG. 9A and FIG. 10A, the no response time relating to the response waveform of the digital flow signal Vqd in FIG. 14A is shortened to be below 0.1 second as similar to the case of FIG. 11A, and the time of later reaching to the flow set value is shortened to be about 0.2 seconds.

When FIG. 9B, FIG. 10B, FIG. 11B and FIG. 14B are compared, during the processing of the output signal Vout reaching to the Vout1 of the steady-state value, the Vout moves upward from a low value and converges at the steady-state value Vout1 in FIG. 9B and FIG. 10B. However, the Vout moves upward to a value higher than the steady-state value Vouot1 at one time in FIG. 11B and FIG. 14B, and then moves downward to converge at the steady-state value Vout1. Conventionally, the flow response tends to cause the overshoot, if the valve unit 6 is driven by such an overshooting signal. However, the flow response in the present invention quickly converges at the set value with 0.2 seconds or the like without the overshoot, because the flow control system is configured to generate the operation quantity signal based on the transfer function design as described above.

The response waveform immediately after the rising in FIG. 14B has the height of the spike-like projection suppressed greater than FIG. 11B by the effects of the transfer function Gss(s) 86 corresponding to the reduction filter. On the other hand, the spike whose width was about 30 ms in the time direction becomes a peak broadened to be 60 ms or the like. By the effects of the duration of this broadened peak, the flow control apparatus 1 obtains the response time approximately similar to the response time in the case of utilizing the output signal Vout corresponding to the spike-like high voltage in FIG. 11B. In the case of FIG. 11B, the output signal Vout from the control unit 4 to the valve driving circuit 5 needs to keep the broader voltage change width within a short time for handling the spike-like high voltage signal and avoiding the saturation at the valve driving circuit 5. However, a smaller value is sufficient in the waveform of FIG. 14B for the voltage change width corresponding to the output signal Vout from the control unit 4 to the valve driving circuit 5, because the output signal Vout higher than the Vout1 is outputted during a longer period.

The flow control apparatus 1 relating to the embodiment 2 can implement the quick response control without the overshoot, similarly to the embodiment 1.

The transfer function Gss(s) 86 corresponding to the reduction filter of the flow control apparatus 1 can reduce the spike-like voltage change corresponding to the signal that is outputted from the control unit 4 to the valve driving circuit 5. The valve driving circuit 5 is saturated if the applied voltage is higher than the power supply voltage of the valve driving circuit 5. In addition, for avoiding the saturation in such a case, it needs to arrange another power supply that can supply a high voltage and to utilize a specific element corresponding to the high voltage as the circuit element, so as to increase the size and the cost of the apparatus. However, the transfer function Gss(s) 86 declines the spike-like voltage change applied to the valve driving circuit 5 to be the voltage change in the step-like manner, so as to suppress the saturation of the valve driving circuit 5. In addition, the transfer function Gss(s) 86 can implement the quick response within a range of standard circuit elements and configurations of an existing power supply. On the other hand, the transfer function Gss(s) 86 of the flow control apparatus 1 implements the quick response control of the laminated piezoelectric element without decreasing the electrical energy supplied to the valve driving circuit 5 and the actuator 61, by lengthening the application time of the voltage supplied to the valve driving circuit 5 and the actuator 61.

It should be understood that the embodiments described herein are only illustrative and not restrictive at all points. The scope of the present invention is defined by the appended claims rather than by the explanation described above, and all changes that fall within metes and bounds of the claims, or equivalence of such metes and bounds thereof are therefore intended to be embraced by the scope of the present invention.

In addition, the technical features (components) described in respective embodiments can be combined to each other, and a new technical feature can be formed by the combination.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. A flow control apparatus comprising:
a piezoelectric element that is coupled to a valve element configuring a flow regulating valve and that works the valve element to regulate a flow;
a driving circuit that applies a voltage to the piezoelectric element to drive the piezoelectric element;
an accepting unit that accepts a target flow; and
an output unit that outputs a signal, corresponding to the voltage applied to the piezoelectric element, to the driving circuit to change the flow so as to coincide the flow with the target flow accepted by the accepting unit, wherein
if the flow regulating valve is closed when the target flow is changed to a new target flow, the output unit transiently outputs, in response to the change to the new target flow, the signal to cause the driving circuit to apply the voltage at a greater amplitude than a target voltage value, wherein application of the target voltage value to the piezoelectric element results in the new target flow, and then the output unit outputs the signal to cause the driving circuit to apply the voltage so the voltage converges from the greater amplitude to the target voltage value, which maintains the valve in an open position to provide the new target flow.

2. The flow control apparatus according to claim 1, wherein
in response to the change to the new target flow when the flow regulating valve is closed, the output unit outputs the signal as a spike-like signal to the driving circuit.

3. The flow control apparatus according to claim 1, wherein
in response to the change to the new target flow when the flow regulating valve is closed, the output unit outputs the signal to cause the driving circuit to apply a voltage change rising in a step-like manner up to the greater amplitude than the target voltage value corresponding to the new target flow after the change, and then outputs the signal to cause the driving circuit to apply the voltage so the voltage converges from the greater amplitude to the target voltage value.

4. A flow control apparatus, comprising:
a detecting unit that detects a flow of a fluid flowing in a flow channel;
a piezoelectric element that is coupled to a valve element configuring a flow regulating valve which opens and closes the flow channel, and that works the valve element to regulate the flow;
a driving circuit that applies a voltage to the piezoelectric element to drive the piezoelectric element;
an accepting unit that accepts a target flow of the fluid; and
a control unit that outputs a signal, corresponding to the voltage applied to the piezoelectric element, to the driving circuit based on a deviation of the target flow accepted by the accepting unit and of the flow detected by the detecting unit, so as to control the flow through the driving circuit and the piezoelectric element, wherein the control unit outputs the signal at a steady state value to produce the target flow when the target flow equals the flow detected by the detecting unit, wherein
the control unit comprises:
a generating unit that generates a signal corresponding to the deviation; and
a compensating unit that compensates the signal generated by the generating unit by a control element to generate the signal, the control element contains a numerical value relating to an electrical characteristic of the piezoelectric element and a constant in accordance with a response characteristic of the piezoelectric element so the signal transiently overshoots the steady state value of the signal before converging at the steady state value in response to a change in the target flow, wherein the signal remains at the steady state value while the flow detected by the detecting unit equals the target flow.

5. The flow control apparatus according to claim 4, wherein
the control element comprises:
a first transfer function that contains a gain relating to the electrical characteristic of the piezoelectric element; and
a second transfer function that contains a constant in accordance with the response characteristic of the piezoelectric element and contains the gain.

6. The flow control apparatus according to claim 5, wherein the first and second transfer functions contain a gain relating to an electrical characteristic of the driving circuit.

7. The flow control apparatus according to claim 5, wherein
the control element relates to a response from a time when a signal is inputted from the control unit to the driving circuit to a time when the piezoelectric element works the valve element.

8. The flow control apparatus according to claim 5, wherein
when the flow regulating valve is closed, the control unit makes a voltage applied by the driving circuit to the piezoelectric element become different from a voltage, at which the valve opening degree of the flow regulating valve becomes zero, by a predetermined voltage Vc in a direction where the flow regulating valve is further closed, and
when the target flow accepted by the accepting unit in a case that the flow regulating valve is in a closed condition is changed, the compensating unit compensates a signal in which the Vc is superimposed on the signal generated by the generating unit.

9. The flow control apparatus according to claim 8, wherein the driving circuit comprises an output unit that outputs a signal, corresponding to the voltage applied to the piezoelectric element, to the control unit,
the signal generating unit is configured to generate a feedback signal in order to regulate the response characteristic of the piezoelectric element based on the signal outputted by the output unit, and
the compensating unit compensates the signal in which the Vc is superimposed on the signal generated by the generating unit and compensates the feedback signal generated by the signal generating unit.

10. The flow control apparatus according to claim 9, further comprising:
a converting unit that converts a signal corresponding to the Vc, based on the second transfer function, wherein the signal generating unit generates the feedback signal by the compensation of the signal outputted by the output unit and the signal converted by the converting unit.

11. The flow control apparatus according to claim 8, further comprising:
a reducing unit that reduces a change of the Vc, wherein
when the target flow accepted by the accepting unit in a case that the flow regulating valve is in a closed condition is changed, the compensating unit compensates a signal in which the Vc reduced by the reducing unit is superimposed on the signal generated by the generating unit.

12. The flow control apparatus according to claim 10, further comprising:
a reducing unit that reduces a change of the Vc, wherein
the converting unit converts a signal corresponding to the Vc reduced by the reducing unit, and
when the target flow accepted by the accepting unit in a case that the flow regulating valve is in a closed condition is changed, the compensating unit compensates a signal in which the Vc reduced by the reducing unit is superimposed on the signal generated by the generating unit and compensates the feedback signal generated by the signal generating unit.

13. The flow control apparatus according to claim 4, wherein
the piezoelectric element is a laminated piezoelectric element.

14. The flow control apparatus according to claim 4, wherein
the flow regulating valve comprises a valve port arranged in the flow channel, and the valve element is a plate-like diaphragm that is capable of being elastically deformed by a pressing force from the piezoelectric element to seat around the valve port.

15. A non-transitory computer-readable recording medium in which a computer program is recorded, the computer program causing a computer of a flow control apparatus to execute processes, the flow control apparatus comprising:
a detecting unit that detects a flow;
a piezoelectric element that is coupled to a valve element configuring a flow regulating valve and that works the valve element to regulate a flow;
a driving circuit that applies a voltage to the piezoelectric element to drive the piezoelectric element; and
an accepting unit that accepts a target flow, wherein
the computer program causes the computer to output a signal, corresponding to a voltage applied to the piezoelectric element based on a deviation of the target flow accepted by the accepting unit and of the flow detected by the detecting unit, to the driving circuit so as to execute processes for controlling a flow through the driving circuit and the piezoelectric element, wherein the computer outputs the signal at a steady state value to produce the target flow when the target flow equals the flow detected by the detecting unit,
wherein the computer program causes the computer to:
generate the signal outputted to the driving circuit based on the deviation, and
execute a compensating computation relating to the generated signal, based on a numerical value relating to an electrical characteristic of the piezoelectric element and on a constant in accordance with a response characteristic of the piezoelectric element so the signal transiently overshoots the steady state value of the signal before converging at the steady state value in response to a change in the target flow, wherein the signal remains at the steady state value while the flow detected by the detecting unit equals the target flow.

16. The non-transitory computer-readable recording medium according to claim 15, wherein a process executing the compensating computation executes the compensating computation relating to the generated signal, with a transfer function consisting of a ratio of a first transfer function that contains a gain relating to the electrical characteristic of the piezoelectric element and a second transfer function that contains a constant in accordance with the response characteristic of the piezoelectric element and the gain.

17. The non-transitory computer-readable recording medium according to claim 15, wherein the computer program causes the computer to:
add a signal corresponding to a predetermined voltage is added to the signal generated by the process that generates the signal, when the target flow accepted by the accepting unit is changed from a value less than a predetermined value to a value equal to or more than the predetermined value.

* * * * *